(12) United States Patent
Gao

(10) Patent No.: US 11,381,364 B2
(45) Date of Patent: Jul. 5, 2022

(54) METHOD OF SENDING UPLINK CONTROL CHANNEL AND DEVICE THEREOF, METHOD OF RECEIVING UPLINK CONTROL CHANNEL AND DEVICE THEREOF, TERMINAL AND BASE STATION

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 154 days.

(21) Appl. No.: 16/623,314

(22) PCT Filed: Jun. 13, 2018

(86) PCT No.: PCT/CN2018/091066
§ 371 (c)(1),
(2) Date: Dec. 16, 2019

(87) PCT Pub. No.: WO2018/228434
PCT Pub. Date: Dec. 20, 2018

(65) Prior Publication Data
US 2020/0204324 A1    Jun. 25, 2020

(30) Foreign Application Priority Data

Jun. 16, 2017  (CN) .......................... 201710456846.X

(51) Int. Cl.
*H04B 7/00*     (2006.01)
*H04L 5/00*     (2006.01)
*H04W 72/04*    (2009.01)

(52) U.S. Cl.
CPC .......... *H04L 5/0053* (2013.01); *H04L 5/0007* (2013.01); *H04W 72/044* (2013.01); *H04W 72/0413* (2013.01)

(58) Field of Classification Search
CPC ...... H04L 5/0051; H04L 5/0055; H04W 4/18; H04W 4/20; H04W 28/12; H04W 72/02;
(Continued)

(56) References Cited

U.S. PATENT DOCUMENTS 8,792,427 B2 *  7/2014  Damnjanovic ....... H04L 5/0055
                                                370/329
10,292,141 B2 *  5/2019  Yang ..................... H04L 5/0094
(Continued)

FOREIGN PATENT DOCUMENTS

CN      106160988 A    11/2016
CN      106301670 A    1/2017
(Continued)

OTHER PUBLICATIONS

Notice of Reasons for Refusal from JP app. No. 2019-569294, dated Mar. 23, 2021, with English translation from Global Dossier.
(Continued)

*Primary Examiner* — Dmitry Levitan
(74) *Attorney, Agent, or Firm* — Ladas & Parry, LLP

(57) ABSTRACT

A method of sending an uplink control channel and a device thereof, a method of receiving an uplink control channel and a device thereof, a terminal and a base station are provided. The method of sending an uplink control channel includes: determining a plurality of target slots for sending uplink control information to be fed back, where the uplink control information to be fed back is sent in the target slots through an uplink control channel; acquiring a transmission duration or format of the uplink control channel carrying the uplink control information to be fed back in each of the target slots,
(Continued)

where the transmission duration or format of the uplink control channel in every target slot is the same; and sending the uplink control channel carrying the uplink control information to be fed back in each of the target slots, according to the determined transmission duration or format of the uplink control channel.

20 Claims, 5 Drawing Sheets

(58) Field of Classification Search
CPC ......... H04W 72/0406; H04W 72/0413; H04W 72/042; H04W 72/0446; H04W 72/08
USPC ......................................... 370/310, 328, 329
See application file for complete search history.

(56) References Cited

U.S. PATENT DOCUMENTS

| | | | |
|---|---|---|---|
| 10,499,424 B2* | 12/2019 | Tiirola | H04W 72/1289 |
| 10,531,434 B2* | 1/2020 | Yang | H04L 5/0037 |
| 10,581,584 B2* | 3/2020 | Tiirola | H04W 72/1268 |
| 2011/0116455 A1 | 5/2011 | Damnjanovic et al. | |
| 2017/0303241 A1 | 10/2017 | Yang et al. | |
| 2018/0145796 A1* | 5/2018 | Liang | H04L 1/1861 |
| 2019/0053097 A1* | 2/2019 | Rico Alvarino | H04L 1/0026 |
| 2019/0261397 A1* | 8/2019 | Takeda | H04L 5/0053 |
| 2019/0373600 A1* | 12/2019 | Takeda | H04W 72/0413 |
| 2020/0052835 A1* | 2/2020 | Xiong | H04L 1/1861 |
| 2020/0059332 A1* | 2/2020 | Takeda | H04L 5/0012 |
| 2020/0170007 A1* | 5/2020 | Gao | H04L 27/2602 |
| 2020/0187194 A1* | 6/2020 | Gao | H04L 5/0012 |
| 2020/0204324 A1* | 6/2020 | Gao | H04W 72/044 |

FOREIGN PATENT DOCUMENTS

| | | |
|---|---|---|
| KR | 20120005545 A | 1/2012 |
| WO | 2016053047 A1 | 4/2016 |
| WO | 2016127409 A1 | 8/2016 |
| WO | 2018112322 A2 | 6/2018 |

OTHER PUBLICATIONS

Notification of Reasons for Refusal from KR app. No. 10-2020-7001308, dated Mar. 29, 2021, with English translation from Global Dossier.
"Higher order modulation schemes for new PUCCH format", R1-154387, 3GPP TSG-RAN1#82, Beijing, China, Aug. 24-28, 2015.
"DCI monitoring occasions and blind detections", R1-1701643, 3GPP TSG-RAN WG1 Meeting #88, Athens, Greece, Feb. 13-17, 2017.
"Structures for Long PUCCH", R1-1705391, 3GPP TSG RAN WG1 #88bis, Spokane, USA, Apr. 3-7, 2017.
Extended European Search Report from EP app. No. 18816845.4, dated Apr. 28, 2020.
First Office Action and search report from CN app. No. 201710456846.X, dated Mar. 20, 2020, with English translation from Global Dossier.
International Search Report from PCT/CN2018/091066, dated Sep. 20, 2018, with English translation from WIPO.
Written Opinion of the International Searching Authority from PCT/CN2018/091066, dated Sep. 20, 2018, with English translation from WIPO.
International Preliminary Report on Patentability from PCT/CN2018/091066, dated Dec. 17, 2019, with English translation from WIPO.
"Resource configuration for long NR-PUCCH" R1-1704910, 3GPP TSG RAN WG1 Meeting #88bis, Spokane, USA, Apr. 3-7, 2017.
"On UCI Repetition", R1-1706045, 3GPP TSG RAN WG1 Meeting #88bis, Spokane, USA, Apr. 3-7, 2017.
"Long Duration PUCCH structure", R1-1706953, 3GPP TSG RAN WG1 Meeting #89, Hangzhou, China, May 15-19, 2017.
"Long PUCCH—½ bits UCI", R1-1707170, 3GPP TSG RAN WG1 Meeting #89, Hangzhou, China, May 15-19, 2017.
"Structure of 1-2 bits HARQ-ACK long PUCCH with TDM DMRS", R1-1707392, 3GPP TSG RAN WG1 Meeting #89, Hangzhou, China, May 15-19, 2017.
"Slot aggregation and configuration for NR long PUCCH", R1-1707713, 3GPP TSG RAN WG1 Meeting #89, Hangzhou, China, May 15-19, 2017.

* cited by examiner

METHOD OF SENDING UPLINK CONTROL CHANNEL AND DEVICE THEREOF, METHOD OF RECEIVING UPLINK CONTROL CHANNEL AND DEVICE THEREOF, TERMINAL AND BASE STATION

CROSS-REFERENCE TO RELATED APPLICATIONS

The present application is the U.S. national phase of PCT Application No. PCT/CN2018/091066 filed on Jun. 13, 2018, which claims a priority to the Chinese patent application No. 201710456846.X filed on Jun. 16, 2017, the disclosures of which are incorporated herein by reference in their entireties.

TECHNICAL FIELD

The present disclosure relates to the field of communication technologies, and in particular, to a method of sending an uplink control channel and a device thereof, a method of receiving an uplink control channel and a device thereof, a terminal and a base station.

BACKGROUND

With the development and change of mobile communication service requirements, organizations such as ITU (International Telecommunication Union, International Telecommunication Union) and 3GPP have begun to study new wireless communication systems (for example, 5G NR, 5Generation New RAT). A new frame structure is defined in the new wireless communication system, and supports different baseband parameters (numerology, including parameters such as subcarrier spacing). For different baseband parameters, it is defined that the length of a sub-frame is always 1 ms, one sub-frame contains A slots. Corresponding to different baseband parameters, the number of A may be different, which is used to meet the sub-frame with a length of 1 ms. For different baseband parameters, one slot may contain 7 or 14 symbols (Orthogonal Frequency Division Multiplexing (OFDM)) or Orthogonal Frequency Division Multiplexing with Discrete Fourier Transform Spread Spectrum Multiple access technology (DFT-S-OFDM) symbols, etc.). For example, when the subcarrier interval is 30 kHz, it is assumed that a slot contains 7 symbols. In order to satisfy a subframe length of 1 ms, a slot needs to include 4 slots. It is assumed that a slot contains 14 symbols. In order to satisfy a subframe length of 1 ms, two subframes need to be included in one subframe. A slot can have multiple slot formats, and different structures correspond to different uplink and downlink resource divisions in a slot. For example, multiple symbols in a slot can be used for downlink transmission, that is, downlink transmission slots (DL only slot), can also be used for uplink transmission, that is, an uplink transmission slot (UL only slot), can also be used for uplink transmission, and part for downlink transmission, that is, uplink and downlink transmission slot (DL+UL slot). The slot format can be notified to the terminal semi-statically through radio resource control RRC signaling, or can be dynamically notified to the terminal through multicast common signaling to implement dynamic change of the slot format.

Because the number of uplink symbols contained in a slot may change, a 5G NR system defines two types of PUCCH: a long Physical Uplink Control Channel (PUCCH) and a short PUCCH. The long PUCCH may be 4 to 14 symbols, and the short PUCCH may be 1 or 2 symbols. In order to improve uplink coverage, when uplink control information (UCI) is transmitted in a long PUCCH, it may also be repeatedly transmitted in multiple slots. Because the size of the uplink area in different slots may be different, there is currently no clear plan on how to perform long PUCCH transmission in multiple slots.

SUMMARY

A method of sending an uplink control channel and a device thereof, a method of receiving an uplink control channel and a device thereof, a terminal and a base station are provided in the present disclosure, to achieve the uplink control channel transmission in a plurality of target slots.

A method of sending an uplink control channel is provided in some embodiments of the present disclosure, including:

determining a plurality of target slots for sending uplink control information to be fed back, where the uplink control information to be fed back is sent in the target slots through an uplink control channel;

acquiring a transmission duration or format of the uplink control channel carrying the uplink control information to be fed back in each of the target slots, where the transmission duration or format of the uplink control channel in every target slot is the same; and sending the uplink control channel carrying the uplink control information to be fed back in each of the target slots, according to the determined transmission duration or format of the uplink control channel.

Optionally, the determining the plurality of target slots for sending the uplink control information to be fed back includes:

determining the plurality of target slots for sending the uplink control information to be fed back, according to predefined information of the plurality of target slots; or determining the plurality of target slots for sending the uplink control information to be fed back, according to information of the plurality of target slots configured by a high layer signalling; or receiving information of the plurality of target slots sent by a preset downlink control channel, to determine the plurality of target slots for sending the uplink control information to be fed back;

where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Optionally, the acquiring the transmission duration or format of the uplink control channel carrying the uplink control information to be fed back in each of the target slots includes:

acquiring the transmission duration or format of the uplink control channel carrying the uplink control information to be fed back in each of target slots, according to a pre-definition; or determining the transmission duration or format of the uplink control channel carrying the uplink control information to be fed back in each of the target slots, according to a configuration of a high layer signalling; or determining the transmission duration or format of the uplink control channel carrying the uplink control information to be fed back in each of the target slots, according to an indication field in a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel and a multicast downlink control channel for indicating slot format of the target slots; or determining the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots.

Optionally, the sending the uplink control channel carrying the uplink control information to be fed back in each of the target slots according to the determined transmission duration or format of the uplink control channel includes:

determining a transmission structure of the uplink control information and a reference signal in the uplink control channel, according to the determined transmission duration or format of the uplink control channel;

sending the uplink control channel carrying the uplink control information to be fed back and the reference signal in each of the target slots, according to the transmission structure.

Optionally, the method further includes:

receiving a start position and/or an end position of the uplink control channel in one or more target slots sent by a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel and a multicast downlink control channel for indicating slot format of the target slots; and/or, determining the start position and/or the end position of the uplink control channel in one or more target slots, according to a pre-agreed rule.

Optionally, the sending the uplink control channel carrying the uplink control information to be fed back in each slot includes:

in the case that a size of the uplink control information to be fed back is smaller than or equal to a first preset value, modulating the uplink control information to be fed back to obtain a modulation symbol, and repeatedly sending the uplink control channel carrying the modulation symbol in each of the target slots;

in the case that the size of the uplink control information to be fed back is larger than the first preset value, performing a channel coding and a rate matching for the uplink control information to be fed back, according to a quantity of symbols carrying the uplink control information in the uplink control channel, to obtain an encoded first bit sequence, and repeatedly sending the uplink control channel carrying the first bit sequence in each of the target slots; or in the case that the size of the uplink control information to be fed back is larger than the first preset value, performing a channel coding and a rate matching for the uplink control information to be fed back, according to a quantity of symbols carrying the uplink control information and a quantity of the target slots in the uplink control channel, to obtain an encoded second bit sequence, and sending, in each target slot, the uplink control channel carrying a sub bit sequence of the second bit sequence corresponding to the each target slot.

A method of receiving an uplink control channel is further provided in some embodiments of the present disclosure, including:

determining a plurality of target slots for sending uplink control information to be fed back, where the uplink control information to be fed back is sent in the target slots through an uplink control channel;

acquiring a transmission duration or format of the uplink control channel carrying the uplink control information to be fed back in each of the target slots, where the transmission duration or format of the uplink control channel in every target slot is the same; and receiving the uplink control channel carrying the uplink control information to be fed back in each of the target slots, according to the determined transmission duration or format of the uplink control channel.

Optionally, the determining the plurality of target slots for sending the uplink control information to be fed back includes:

determining the plurality of target slots for sending the uplink control information to be fed back, according to predefined information of the plurality of target slots.

Optionally, subsequent to the determining the plurality of target slots for sending the uplink control information to be fed back, the method includes:

sending information of the plurality of target slots to a terminal through a high layer signalling or a preset downlink control channel;

where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Optionally, the acquiring the transmission duration or format of the uplink control channel carrying the uplink control information to be fed back in each of the target slots includes:

acquiring the transmission duration or format of the uplink control channel carrying the uplink control information to be fed back in each of target slots, according to a pre-definition; or determining the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots.

Optionally, subsequent to the acquiring the transmission duration or format of the uplink control channel carrying the uplink control information to be fed back in each of the target slots, the method further includes:

sending the transmission duration or format of the uplink control channel carrying the uplink control information to be fed back in each of the target slots, through a high layer signalling or a preset downlink control channel;

where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Optionally, the receiving the uplink control channel carrying the uplink control information to be fed back in each of the target slots according to the determined transmission duration or format of the uplink control channel includes:

determining a transmission structure of the uplink control information and a reference signal in the uplink control channel, according to the determined transmission duration or format of the uplink control channel;

receiving the uplink control channel carrying the uplink control information to be fed back and the reference signal in each of the target slots, according to the transmission structure.

Optionally, the method further includes:

determining a start position and/or an end position of the uplink control channel in one or more target slots, according to a pre-agreed rule.

Optionally, the method further includes:

sending to a terminal a start position and/or an end position of the uplink control channel in one or more target slots, through a preset downlink control channel;

where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Optionally, the receiving the uplink control channel carrying the uplink control information to be fed back in each of the target slots includes:

in the case that a size of the uplink control information to be fed back is smaller than or equal to a first preset value, receiving the uplink control channel carrying a modulation symbol in each of the target slots, where the modulation symbol is acquired by modulating the uplink control information to be fed back by a terminal;

in the case that the size of the uplink control information to be fed back is larger than the first preset value, receiving the uplink control channel carrying a first bit sequence in each of the target slots, or in the case that the size of the uplink control information to be fed back is larger than the first preset value, receiving, in each target slot, the uplink control channel carrying a sub bit sequence of a second bit sequence corresponding to the each target slot;

where the first bit sequence is an encoded bit sequence acquired by performing by the terminal a channel coding and a rate matching for the uplink control information to be fed back according to a quantity of symbols carrying the uplink control information in the uplink control channel; the second bit sequence is an encoded bit sequence acquired by performing by the terminal a channel coding and a rate matching for the uplink control information to be fed back according to the quantity of symbols carrying the uplink control information and a quantity of the target slots in the uplink control channel.

Optionally, subsequent to the receiving the uplink control channel carrying the uplink control information to be fed back in each of the target slots according to the determined transmission duration or format of the uplink control channel, the method further includes:

acquiring, from the uplink control channel, the uplink control information to be fed back.

Optionally, the acquiring, from the uplink control channel, the uplink control information to be fed back includes:

in the case that a size of the uplink control information to be fed back is smaller than or equal to a first preset value, combining the modulation symbol received in every target slot, and determining the uplink control information to be fed back based on the combined modulation symbol;

in the case that the size of the uplink control information to be fed back is larger than the first preset value, combining the first bit sequence received in every target slot, and decoding the combined first bit sequence to determine the uplink control information to be fed back, or combining a modulation symbol sequence corresponding to the first bit sequence received in every target slot, obtaining the first bit sequence based on the combined modulation symbol sequence, and decoding the first bit sequence to determine the uplink control information to be fed back; or cascading a sub sequence of the second bit sequence received in every target slot to obtain the second bit sequence, and decoding the second bit sequence to determine the uplink control information to be fed back.

A device of sending an uplink control channel is further provided in some embodiments of the present disclosure, including:

a first determining module, configured to determine a plurality of target slots for sending uplink control information to be fed back, where the uplink control information to be fed back is sent in the target slots through an uplink control channel;

a first acquiring module, configured to acquire a transmission duration or format of the uplink control channel carrying the uplink control information to be fed back in each of the target slots, where the transmission duration or format of the uplink control channel in every target slot is the same; and a sending module, configured to send the uplink control channel carrying the uplink control information to be fed back in each of the target slots, according to the determined transmission duration or format of the uplink control channel.

Optionally, the first determining module includes:

a first determining sub-module, configured to determine the plurality of target slots for sending the uplink control information to be fed back, according to predefined information of the plurality of target slots; and/or a second determining sub-module, configured to determine the plurality of target slots for sending the uplink control information to be fed back, according to information of the plurality of target slots configured by a high layer signalling; and/or a third determining sub-module, configured to receive information of the plurality of target slots sent by a preset downlink control channel, to determine the plurality of target slots for sending the uplink control information to be fed back;

where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Optionally, the first acquiring module includes:

a first acquiring sub-module, configured to acquire the transmission duration or format of the uplink control channel carrying the uplink control information to be fed back in each of target slots, according to a pre-definition; and/or a second acquiring sub-module, configured to determine the transmission duration or format of the uplink control channel carrying the uplink control information to be fed back in each of the target slots, according to a configuration of a high layer signalling; and/or a third acquiring sub-module, configured to determine the transmission duration or format of the uplink control channel carrying the uplink control information to be fed back in each of the target slots, according to an indication field in a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel and a multicast downlink control channel for indicating slot format of the target slots; and/or a fourth acquiring sub-module, configured to determine the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots.

Optionally, the sending module includes:

a structure determining sub-module, configured to determine a transmission structure of the uplink control information and a reference signal in the uplink control channel, according to the determined transmission duration or format of the uplink control channel;

a first sending sub-module, configured to send the uplink control channel carrying the uplink control information to be fed back and the reference signal in each of the target slots, according to the transmission structure.

Optionally, the device further includes:

a first position determining module, configured to receive a start position and/or an end position of the uplink control channel in one or more target slots sent by a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel and a multicast downlink control channel for indicating slot format of the target slots; and/or, a second position determining module, configured to determine the start position and/or the end position of the uplink control channel in one or more target slots, according to a pre-agreed rule.

Optionally, the sending module includes:

a second sending sub-module, configured to, in the case that a size of the uplink control information to be fed back is smaller than or equal to a first preset value, modulate the uplink control information to be fed back to obtain a modulation symbol, and repeatedly send the uplink control channel carrying the modulation symbol in each of the target slots;

a third sending sub-module, configured to, in the case that the size of the uplink control information to be fed back is larger than the first preset value, perform a channel coding and a rate matching for the uplink control information to be fed back, according to a quantity of symbols carrying the uplink control information in the uplink control channel, to obtain an encoded first bit sequence, and repeatedly send the uplink control channel carrying the first bit sequence in each of the target slots; or in the case that the size of the uplink control information to be fed back is larger than the first preset value, perform a channel coding and a rate matching for the uplink control information to be fed back, according to a quantity of symbols carrying the uplink control information and a quantity of the target slots in the uplink control channel, to obtain an encoded second bit sequence, and send, in each target slot, the uplink control channel carrying a sub bit sequence of the second bit sequence corresponding to the each target slot.

A terminal is further provided in some embodiments of the present disclosure, including: a processor, a memory connected to the processor via a bus interface and a transceiver connected to the processor via the bus interface, the memory is configured to store program and data used by the processor when performing an operation, and a control command is sent by the transceiver. When the program and data stored in the memory is called and executed by the processor, the program is executed by the processor to perform:

determining a plurality of target slots for sending uplink control information to be fed back, where the uplink control information to be fed back is sent in the target slots through an uplink control channel;

acquiring a transmission duration or format of the uplink control channel carrying the uplink control information to be fed back in each of the target slots, where the transmission duration or format of the uplink control channel in every target slot is the same; and sending the uplink control channel carrying the uplink control information to be fed back in each of the target slots, according to the determined transmission duration or format of the uplink control channel.

A computer-readable storage medium is further provided in some embodiments of the present disclosure, where a computer program is stored in the computer-readable storage medium, and the computer program is executed by the processor to perform:

determining a plurality of target slots for sending uplink control information to be fed back, where the uplink control information to be fed back is sent in the target slots through an uplink control channel;

acquiring a transmission duration or format of the uplink control channel carrying the uplink control information to be fed back in each of the target slots, where the transmission duration or format of the uplink control channel in every target slot is the same; and sending the uplink control channel carrying the uplink control information to be fed back in each of the target slots, according to the determined transmission duration or format of the uplink control channel.

A device of receiving an uplink control channel is further provided in some embodiments of the present disclosure, including:

a second determining module, configured to determine a plurality of target slots for sending uplink control information to be fed back, where the uplink control information to be fed back is sent in the target slots through an uplink control channel;

a second acquiring module, configured to acquire a transmission duration or format of the uplink control channel carrying the uplink control information to be fed back in each of the target slots, where the transmission duration or format of the uplink control channel in every target slot is the same; and a receiving module, configured to receive the uplink control channel carrying the uplink control information to be fed back in each of the target slots, according to the determined transmission duration or format of the uplink control channel.

Optionally, the second determining module includes:

a fourth determining sub-module, configured to determine the plurality of target slots for sending the uplink control information to be fed back, according to predefined information of the plurality of target slots.

Optionally, the device further includes:

a first information sending module, configured to send information of the plurality of target slots to a terminal through a high layer signalling or a preset downlink control channel;

where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Optionally, the second acquiring module includes:

a fifth acquiring module, configured to acquire the transmission duration or format of the uplink control channel carrying the uplink control information to be fed back in each of target slots, according to a pre-definition; or a sixth acquiring module, configured to determine the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots.

Optionally, the device further includes:

a second information sending module, configured to send the transmission duration or format of the uplink control channel carrying the uplink control information to be fed back in each of the target slots, through a high layer signalling or a preset downlink control channel;

where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Optionally, the receiving module includes:

a transmission structure determining sub-module, configured to determine a transmission structure of the uplink control information and a reference signal in the uplink control channel, according to the determined transmission duration or format of the uplink control channel;

a first receiving sub-module, configured to receive the uplink control channel carrying the uplink control information to be fed back and the reference signal in each of the target slots, according to the transmission structure.

Optionally, the device further includes:

a third position determining sub-module, configured to determine a start position and/or an end position of the uplink control channel in one or more target slots, according to a pre-agreed rule.

Optionally, the device further includes:

a third information sending module, configured to send to a terminal a start position and/or an end position of the uplink control channel in one or more target slots, through a preset downlink control channel;

where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Optionally, the receiving module includes:

a second receiving sub-module, configured to, in the case that a size of the uplink control information to be fed back is smaller than or equal to a first preset value, receive the uplink control channel carrying a modulation symbol in each of the target slots, where the modulation symbol is acquired by modulating the uplink control information to be fed back by a terminal;

a third receiving sub-module, configured to, in the case that the size of the uplink control information to be fed back is larger than the first preset value, receive the uplink control channel carrying a first bit sequence in each of the target slots, or in the case that the size of the uplink control information to be fed back is larger than the first preset value, receive, in each target slot, the uplink control channel carrying a sub bit sequence of a second bit sequence corresponding to the each target slot;

where the first bit sequence is an encoded bit sequence acquired by performing by the terminal a channel coding and a rate matching for the uplink control information to be fed back according to a quantity of symbols carrying the uplink control information in the uplink control channel; the second bit sequence is an encoded bit sequence acquired by performing by the terminal a channel coding and a rate matching for the uplink control information to be fed back according to the quantity of symbols carrying the uplink control information and a quantity of the target slots in the uplink control channel.

Optionally, the device further includes:

an information acquiring module, configured to acquire, from the uplink control channel, the uplink control information to be fed back.

Optionally, the information acquiring module includes:

a first information acquiring sub-module, configured to, in the case that a size of the uplink control information to be fed back is smaller than or equal to a first preset value, combine the modulation symbol received in every target slot, and determine the uplink control information to be fed back based on the combined modulation symbol;

a second information acquiring sub-module, configured to, in the case that the size of the uplink control information to be fed back is larger than the first preset value, combine the first bit sequence received in every target slot, and decode the combined first bit sequence to determine the uplink control information to be fed back, or combine a modulation symbol sequence corresponding to the first bit sequence received in every target slot, obtain the first bit sequence based on the combined modulation symbol sequence, and decode the first bit sequence to determine the uplink control information to be fed back; or cascade a sub sequence of the second bit sequence received in every target slot to obtain the second bit sequence, and decode the second bit sequence to determine the uplink control information to be fed back.

A base station is further provided in some embodiments of the present disclosure, including: a processor, a memory connected to the processor via a bus interface and a transceiver connected to the processor via the bus interface, the memory is configured to store program and data used by the processor when performing an operation, and a control command is sent by the transceiver. When the program and data stored in the memory is called and executed by the processor, the program is executed by the processor to perform:

determining a plurality of target slots for sending uplink control information to be fed back, where the uplink control information to be fed back is sent in the target slots through an uplink control channel;

acquiring a transmission duration or format of the uplink control channel carrying the uplink control information to be fed back in each of the target slots, where the transmission duration or format of the uplink control channel in every target slot is the same; and receiving the uplink control channel carrying the uplink control information to be fed back in each of the target slots, according to the determined transmission duration or format of the uplink control channel.

A computer-readable storage medium is further provided in some embodiments of the present disclosure, where a computer program is stored in the computer-readable storage medium, and the computer program is executed by the processor to perform:

determining a plurality of target slots for sending uplink control information to be fed back, where the uplink control information to be fed back is sent in the target slots through an uplink control channel;

acquiring a transmission duration or format of the uplink control channel carrying the uplink control information to be fed back in each of the target slots, where the transmission duration or format of the uplink control channel in every target slot is the same; and receiving the uplink control channel carrying the uplink control information to be fed back in each of the target slots, according to the determined transmission duration or format of the uplink control channel.

According to the method of sending the uplink control channel and the device thereof, the method of receiving the uplink control channel and the device thereof, the terminal and the base station, when the terminal needs to transmit the uplink control channel in a plurality of target slots, the terminal transmits the uplink control channel according to the same transmission duration or format of the uplink control channel in the plurality of target slots, thereby transmitting the uplink control channel in the plurality of target slots.

DETAILED DESCRIPTION

In order that the technical problems to be solved by the present disclosure as well as the technical solutions and advantages will become clearer, the present disclosure will be described in detail below in conjunction with the drawings and embodiments.

Figure 1:
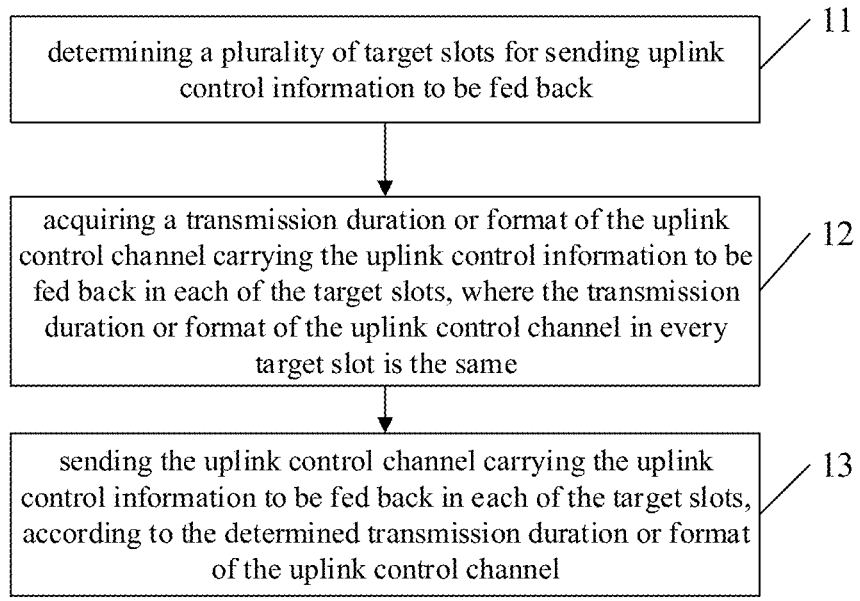
FIG. 1 is a of a method of sending an uplink control channel in some embodiments of the present disclosure.

As shown in FIG. 1, a method for sending an uplink control channel is provided in some embodiments of the present disclosure, including:

Step 11: determining a plurality of target slots for sending uplink control information to be fed back, where the uplink control information to be fed back is sent in the target slots through an uplink control channel.

In this step, the method for sending an uplink control channel is generally applied to the terminal side, that is, the terminal determines the uplink control information UCI to be fed back, and determines that the UCI to be fed back is transmitted through the uplink control channel in multiple target slots.

Step 12: acquiring a transmission duration or format of the uplink control channel carrying the uplink control information to be fed back in each of the target slots, where the transmission duration or format of the uplink control channel in every target slot is the same.

In this step, the transmission durations or formats of the uplink control channel carrying the UCI to be fed back in different target slots are the same. For example, the transmission duration of the uplink control channel carrying the UCI to be fed back in the target slot 1 is 7 symbols, the transmission durations of the uplink control channel carrying the UCI to be fed back in other target slots (such as target slots 2, 3, etc.) are also 7 symbols.

Step 13: sending the uplink control channel carrying the uplink control information to be fed back in each of the target slots, according to the determined transmission duration or format of the uplink control channel.

In this step, a transmission duration or format corresponds to a transmission structure, that is, an uplink control channel carrying the UCI to be fed back is sent in each target slot according to the corresponding transmission structure.

Specifically, in some embodiment of the present disclosure, Step 11 includes:

determining the plurality of target slots for sending the uplink control information to be fed back, according to predefined information of the plurality of target slots, where the pre-definition is a definition of a standard complied by both the terminal and the base station; or, determining the plurality of target slots for sending the uplink control information to be fed back, according to information of the plurality of target slots configured by a high layer signalling; or receiving information of the plurality of target slots sent by a preset downlink control channel, to determine the plurality of target slots for sending the uplink control information to be fed back, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Specifically, the information of the plurality of target slots includes at least: a quantity of the target slots and the identification of the target slots; for example, four target slots which are target slot 1, target slot 2, target slot 3 and target slot 4.

Further, Step 12 in some embodiment of the present disclosure includes:

acquiring the transmission duration or format of the uplink control channel carrying the uplink control information to be fed back in each of target slots, according to a pre-definition; or determining the transmission duration or format of the uplink control channel carrying the uplink control information to be fed back in each of the target slots, according to a configuration of a high layer signalling; or determining the transmission duration or format of the uplink control channel carrying the uplink control information to be fed back in each of the target slots, according to an indication field in a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel and a multicast downlink control channel for indicating slot format of the target slots; or determining the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots. For example, the transmission duration or format of the uplink control channel is determined according to the size of the uplink area of the first target slot among multiple target slots; for another example, the transmission duration or format of the uplink control channel is determined according to the average value of the sizes of the uplink areas of all target slots in the multiple target slots; for another example, the transmission duration or format of the uplink control channel is determined according to the size of the uplink area of the target slot having the smallest uplink area among the multiple target slots.

It should be noted that the transmission duration of the uplink control channel and the format thereof may be in a one-to-one correspondence. For example, one transmission duration corresponds to a unique format, or one format corresponds to a unique transmission duration. Alternatively, the same transmission duration may correspond to multiple formats, so the transmission duration may be by determined once the format is determined; or the same format may correspond to multiple transmission durations, so the format may be determined once the transmission duration is determined.

Further, in some embodiments of the present disclosure, Step 13 includes:

determining a transmission structure of the uplink control information and a reference signal in the uplink control channel, according to the determined transmission duration or format of the uplink control channel;

sending the uplink control channel carrying the uplink control information to be fed back and the reference signal in each of the target slots, according to the transmission structure.

In some embodiments of the present disclosure, one transmission duration or format corresponds to a transmission structure of uplink control information UCI and reference signal RS. That is, a mapping structure when the uplink control channel performs UCI and RS mapping may be determined according to the transmission duration or format. In other words, which of the multiple symbols occupied by the uplink control channel are used to transmit UCI and which of the symbols are used to transmit RS. For example, if the transmission duration is 7 symbols and the format is x1, the corresponding structure of UCI and RS is UURRRUU (or URUURRU), where U is the symbol position for transmitting UCI among the 7 symbols, and R is the symbol position for transmitting RS among the 7 symbols. For another example, if the transmission duration is 4 symbols and the format is x2, the corresponding structure of UCI and RS is URRU (or RURU). In summary, once the transmission duration or format is determined, the corresponding structure of UCI and RS may be determined, and then the UCI and RS may be transmitted in the uplink control channel according to the structure.

It should be noted that the above-mentioned transmission structures are only some embodiments of the present disclosure, and there may be other structures. For different transmission durations and the determination whether there is frequency hopping between symbols, there may also be different structures of UCI and RS, which is not described herein.

In some embodiments of the present disclosure, since multiple target slots may include the same uplink area or an uplink area for transmitting an uplink control channel, or may include different uplink areas or uplink areas for transmitting an uplink control channel, for the uplink control channels having the same transmission duration or format, the positions of the uplink control channels in multiple target slots may be the same or different. Therefore, in order to more accurately determine the position of the uplink control channel carrying the UCI to be fed back, the method of sending an uplink control channel in the embodiments of the present disclosure may further determine a starting position and/or an end position of the uplink control channel in each of the multiple target slots.

Specifically, the determining the starting position and/or the end position of the uplink control channel in each of the multiple target slots further includes:

receiving a start position and/or an end position of the uplink control channel in one or more target slots sent by a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel and a multicast downlink control channel for indicating slot format of the target slots; and/or, determining the start position and/or the end position of the uplink control channel in one or more target slots, according to a pre-agreed rule.

Specifically, if each of the multiple target slots includes an uplink area of the same size or an uplink area of the same size for transmitting an uplink control channel, then:

the starting position and/or the end position of the uplink control channel in the uplink area (or the uplink area for transmitting the uplink control channel) of every target slot is the same, which may be a pre-agreed position or may be determined according to an indication field in a preset downlink control channel.

If at least two of the multiple target slots include uplink areas of different sizes or uplink areas of different sizes for transmitting uplink control channels, then:

the start position and/or the end position of each uplink control channel may be determined according to an indication field of the preset downlink control channel, where each target slot in the multiple target slots corresponds to an independent indication.

Alternatively, the start position and/or the end position of the uplink control channel in the first target slot of the multiple target slots is determined according to an indication field in a preset downlink control channel, where the preset downlink control channel only indicates one start position and/or end position. However, in other target slots of multiple target slots, the start position and/or end position of the uplink control channel thereof is determined according to a pre-agreed rule. For example, it is pre-agreed that the uplink control channel occupies the entire uplink area in the target subframe or the entire uplink area for transmitting the uplink control channel in the target subframe, or it is pre-agreed that uplink control channel begins from the $A_{th}$ symbol in the uplink area in the target subframe or from the $A_{th}$ symbol in the uplink area for transmitting the uplink control channel in the target subframe, or it is pre-agreed that uplink control channel ends at the $B_{th}$ last symbol in the uplink area in the target subframe or from the $B_{th}$ last symbol in the uplink area for transmitting the uplink control channel in the target subframe, and the like.

Alternatively, in each of the multiple target slots, the start position and/or end position of the uplink control channel thereof is determined according to a pre-agreed rule. For example, it is pre-agreed that the uplink control channel occupies the entire uplink area in the target subframe or the entire uplink area for transmitting the uplink control channel in the target subframe, or it is pre-agreed that uplink control channel begins from the $A_{th}$ symbol in the uplink area in the target subframe or from the $A_{th}$ symbol in the uplink area for transmitting the uplink control channel in the target subframe, or it is pre-agreed that uplink control channel ends at the $B_{th}$ last symbol in the uplink area in the target subframe or from the $B_{th}$ last symbol in the uplink area for transmitting the uplink control channel in the target subframe, and the like.

It should be noted that:

If the information indicating the structure of the target slot is not obtained (that is, the uplink area or the uplink area used for transmitting the uplink control channel in each target slot cannot be determined), or if the size of the uplink area in the target slot (or the size of the uplink area for transmitting the uplink control channel) is smaller than the transmission duration corresponding to the determined transmission duration or the determined format, or the start position and/or the end position determined according to an indication field of a preset downlink control channel or according to a pre-agreed rule does not match the uplink area in the target slot (or the area for transmitting the uplink control channel in the uplink area) (for example, the indicated start and/or end positions are not in this range), the terminal may skip this target slot and continue the transmission in the next target slot (this target slot may be counted nor not counted into N target slots, N is the predetermined quantity of target slots for transmitting UCI).

Further, in the above case, if the terminal receives a preset downlink control channel and the preset downlink control channel indicates the starting position and/or the end position of the uplink control channel, the terminal may also transmit the uplink control channel in the target slot according to the indicated starting position and/or the end position and the transmission duration corresponding to determined transmission duration or the determined format (that is, regardless of the uplink and downlink resource allocation in the target slot, regardless of the size of the uplink area or the area used to transmit the uplink control channel in the uplink area in the target slot, the terminal always transmits according to the indicated position). Alternatively, in the above case, the terminal always determines the target slot according to a predetermined rule The start position and/or the end position in the channel, and the determined transmission duration or the transmission duration corresponding to the determined format, uplink control channel transmission is performed in the target slot (that is, regardless of the uplink and downlink resources in the target slot) Allocation regardless of the size of the uplink area in the target slot or the area used to transmit the uplink control channel in the uplink slot, and finally Always transmitted according to the position indication); or the terminal may transmit the uplink control channel in the target slot according to the starting position and/or the end position in the target slot determined based on the pre-agreed rule and the transmission duration corresponding to determined transmission duration or the determined format (that is, regardless of the uplink and downlink resource allocation in the target slot, regardless of the size of the uplink area or the area used to transmit the uplink control channel in the uplink area in the target slot, the terminal always transmits according to the indicated position).

Further, in some embodiments of the present disclosure, Step 13 includes:

in the case that a size of the uplink control information to be fed back is smaller than or equal to a first preset value, modulating the uplink control information to be fed back to obtain a modulation symbol, and repeatedly sending the uplink control channel carrying the modulation symbol in each of the target slots, where the first preset value is generally be set to 2 bits, that is, when the UCI to be fed back occupies 1 bit or 2 bits, the 1 or 2 bits UCI is modulated to obtain one modulation symbol, the obtained modulation symbol is repeatedly transmitted in each target slot of the multiple target slots and in an uplink control channel having a corresponding transmission duration or format; or In the case that the size of the uplink control information to be fed back is larger than the first preset value, performing a channel coding and a rate matching for the uplink control information to be fed back, according to a quantity of symbols carrying the uplink control information in the uplink control channel, to obtain an encoded first bit sequence, and repeatedly sending the uplink control channel carrying the first bit sequence in each of the target slots, where when the UCI to be fed back is greater than 2 bits, the channel coding and rate matching is performed for the UCI to be fed back according to a quantity of symbols carrying the uplink control information in the uplink control channel having a corresponding transmission duration or format, to obtain the encoded first bit sequence, and repeatedly send the first bit sequence in each of the target slots; or in the case that the size of the uplink control information to be fed back is larger than the first preset value, performing a channel coding and a rate matching for the uplink control information to be fed back, according to a quantity of symbols carrying the uplink control information and a quantity of the target slots in the uplink control channel, to obtain an encoded second bit sequence, and sending, in each target slot, the uplink control channel carrying a sub bit sequence of the second bit sequence corresponding to the each target slot; that is, when the UCI to be fed back is greater than 2 bits, the channel coding and the rate matching are performed for the UCI to be fed back based on the quantity of symbols carrying the UCI and the quantity of target slots in the uplink control channel having the corresponding transmission duration or format, to obtain the encoded second bit sequence, and then the sub bit sequence corresponding to the target slot in the second bit sequence is taken to be transmitted in the target slot. For example, the second bit sequence is 111000111, and there are three target slots which are target slot 1, target slot 2 and target slot is 3. The sub bit sequence corresponding to target slot 1 is 111, the sub bit sequence corresponding to the target slot 2 is 000, and the sub bit sequence corresponding to the target slot 3 is 111. Then, the uplink control channel carrying the sub bit sequence 111 is transmitted in the target slot 1, the uplink control channel carrying the sub bit sequence 000 is transmitted in the target slot 2, and the uplink control channel carrying the sub bit sequence 111 is transmitted in the target slot 3.

In summary, according to the method of sending an uplink control channel in some embodiments of the present disclosure, when the terminal needs to transmit the uplink control channel in a plurality of target slots, the terminal transmits the uplink control channel according to the same transmission duration or format of the uplink control channel in the plurality of target slots, thereby transmitting the uplink control channel in the plurality of target slots.

Figure 2:
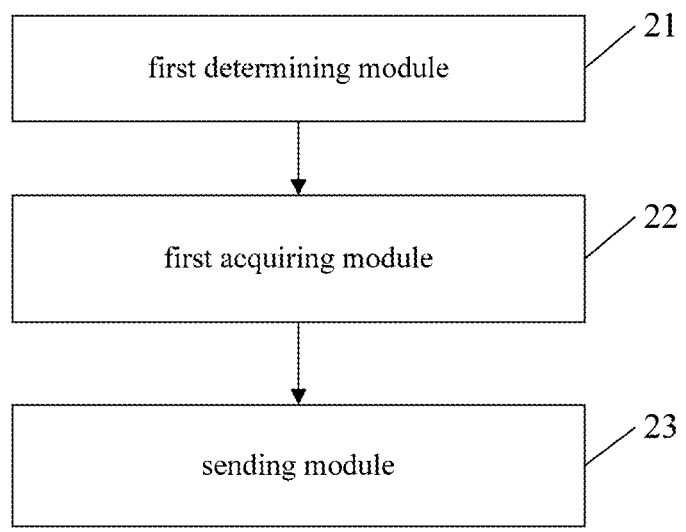
FIG. 2 is a schematic view of a device of sending an uplink control channel in some embodiments of the present disclosure.

In order to better achieve the foregoing objective, as shown in FIG. 2, a device of sending an uplink control channel is further provided in some embodiments of the present disclosure, including:

a first determining module 21, configured to determine a plurality of target slots for sending uplink control information to be fed back, where the uplink control information to be fed back is sent in the target slots through an uplink control channel;

a first acquiring module 22, configured to acquire a transmission duration or format of the uplink control channel carrying the uplink control information to be fed back in each of the target slots, where the transmission duration or format of the uplink control channel in every target slot is the same; and a sending module 23, configured to send the uplink control channel carrying the uplink control information to be fed back in each of the target slots, according to the determined transmission duration or format of the uplink control channel.

Optionally, the first determining module includes:

a first determining sub-module, configured to determine the plurality of target slots for sending the uplink control information to be fed back, according to predefined information of the plurality of target slots; and/or a second determining sub-module, configured to determine the plurality of target slots for sending the uplink control information to be fed back, according to information of the plurality of target slots configured by a high layer signalling; and/or a third determining sub-module, configured to receive information of the plurality of target slots sent by a preset downlink control channel, to determine the plurality of target slots for sending the uplink control information to be fed back; where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

In some embodiments of the present disclosure, the first acquiring module 22 includes:

a first acquiring sub-module, configured to acquire the transmission duration or format of the uplink control channel carrying the uplink control information to be fed back in each of target slots, according to a pre-definition; and/or a second acquiring sub-module, configured to determine the transmission duration or format of the uplink control channel carrying the uplink control information to be fed back in each of the target slots, according to a configuration of a high layer signalling; and/or a third acquiring sub-module, configured to determine the transmission duration or format of the uplink control channel carrying the uplink control information to be fed back in each of the target slots, according to an indication field in a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel and a multicast downlink control channel for indicating slot format of the target slots; and/or a fourth acquiring sub-module, configured to determine the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots.

In some embodiments of the present disclosure, the sending module 23 includes:

a structure determining sub-module, configured to determine a transmission structure of the uplink control information and a reference signal in the uplink control channel, according to the determined transmission duration or format of the uplink control channel;

a first sending sub-module, configured to send the uplink control channel carrying the uplink control information to be fed back and the reference signal in each of the target slots, according to the transmission structure.

In some embodiments of the present disclosure, the device further includes:

a first position determining module, configured to receive a start position and/or an end position of the uplink control channel in one or more target slots sent by a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel and a multicast downlink control channel for indicating slot format of the target slots; and/or, a second position determining module, configured to determine the start position and/or the end position of the uplink control channel in one or more target slots, according to a pre-agreed rule.

In some embodiments of the present disclosure, the sending module 23 includes:

a second sending sub-module, configured to, in the case that a size of the uplink control information to be fed back is smaller than or equal to a first preset value, modulate the uplink control information to be fed back to obtain a modulation symbol, and repeatedly send the uplink control channel carrying the modulation symbol in each of the target slots;

a third sending sub-module, configured to, in the case that the size of the uplink control information to be fed back is larger than the first preset value, perform a channel coding and a rate matching for the uplink control information to be fed back, according to a quantity of symbols carrying the uplink control information in the uplink control channel, to obtain an encoded first bit sequence, and repeatedly send the uplink control channel carrying the first bit sequence in each of the target slots; or in the case that the size of the uplink control information to be fed back is larger than the first preset value, perform a channel coding and a rate matching for the uplink control information to be fed back, according to a quantity of symbols carrying the uplink control information and a quantity of the target slots in the uplink control channel, to obtain an encoded second bit sequence, and send, in each target slot, the uplink control channel carrying a sub bit sequence of the second bit sequence corresponding to the each target slot.

In summary, according to the device of sending an uplink control channel in some embodiments of the present disclosure, when the terminal needs to transmit the uplink control channel in a plurality of target slots, the terminal transmits the uplink control channel according to the same transmission duration or format of the uplink control channel in the plurality of target slots, thereby transmitting the uplink control channel in the plurality of target slots.

It should be noted that the device of sending the uplink control channel in the embodiments of the present disclosure is a sending device corresponding to the method of sending the uplink control channel, and all embodiments of the method of sending the uplink control channel are applicable to the device of sending the uplink control channel and can achieve the same or similar beneficial effects.

Figure 3:
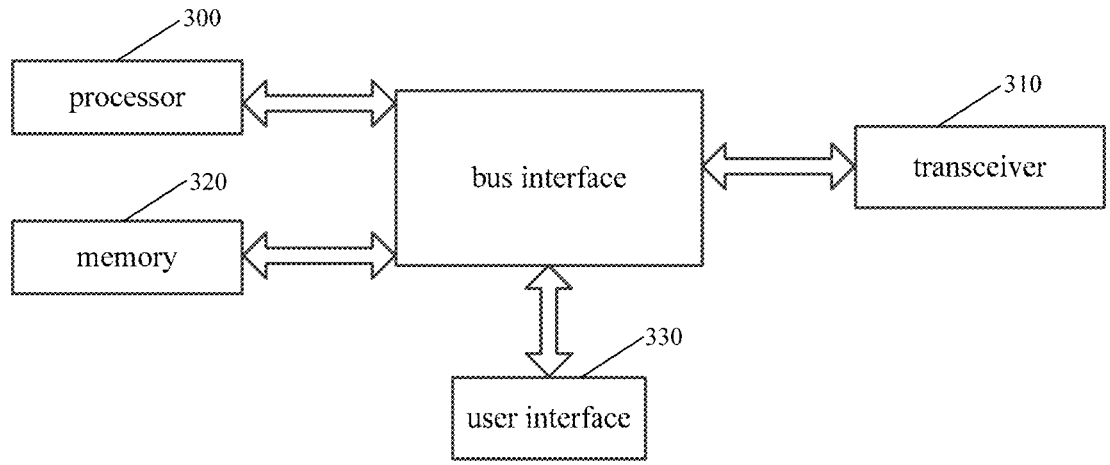
FIG. 3 is a schematic view of a terminal in some embodiments of the present disclosure.

In order to better achieve the foregoing objective, as shown in FIG. 3, a terminal is further provided in some embodiments of the present disclosure, including a processor 300, a memory 320 connected to the processor 300 via a bus interface and a transceiver 310 connected to the processor 300 via the bus interface, the memory is configured to store program and data used by the processor when performing an operation, and a control command is sent by the transceiver 310. When the program and data stored in the memory is called and executed by the processor, the program is executed by the processor to perform:

determining a plurality of target slots for sending uplink control information to be fed back, where the uplink control information to be fed back is sent in the target slots through an uplink control channel;

acquiring a transmission duration or format of the uplink control channel carrying the uplink control information to be fed back in each of the target slots, where the transmission duration or format of the uplink control channel in every target slot is the same; and sending the uplink control channel carrying the uplink control information to be fed back in each of the target slots, according to the determined transmission duration or format of the uplink control channel.

As shown in FIG. 3, the bus architecture may include any number of interconnected buses and bridges. Specifically, one or more processors represented by the processor 300 and various circuits of the memory represented by the memory 320 are linked together. The bus architecture can also link various other circuits such as peripherals, voltage regulators, and power management circuits, which are well known in the art, so they are not further described herein. The bus interface provides an interface. The transceiver 310 may be multiple elements, including a transmitter and a receiver, providing a unit for communicating with various other devices over a transmission medium. For different user equipment, the user interface 330 may also be an interface capable of externally connecting internally required devices, and the connected devices include, but are not limited to, a keypad, a display, a speaker, a microphone, a joystick, and the like.

The processor 300 is responsible for managing the bus architecture and general processing, and the memory 320 may store data used by the processor 300 when performing operations.

In summary, according to the terminal in some embodiments of the present disclosure, when the terminal needs to transmit the uplink control channel in a plurality of target slots, the terminal transmits the uplink control channel according to the same transmission duration or format of the uplink control channel in the plurality of target slots, thereby transmitting the uplink control channel in the plurality of target slots.

It should be noted that the terminal in the embodiments of the present disclosure is a terminal corresponding to the method of sending the uplink control channel, and all embodiments of the method of sending the uplink control channel are applicable to the terminal and can achieve the same or similar beneficial effects.

In order to better achieve the foregoing objective, a computer-readable storage medium is further provided in some embodiments of the present disclosure, where a computer program is stored in the computer-readable storage medium, and the computer program is executed by the processor to perform:

determining a plurality of target slots for sending uplink control information to be fed back, where the uplink control information to be fed back is sent in the target slots through an uplink control channel;

acquiring a transmission duration or format of the uplink control channel carrying the uplink control information to be fed back in each of the target slots, where the transmission duration or format of the uplink control channel in every target slot is the same; and sending the uplink control channel carrying the uplink control information to be fed back in each of the target slots, according to the determined transmission duration or format of the uplink control channel.

The computer-readable storage medium includes permanent and non-permanent, removable and non-removable media. Information can be stored by any method or technology. Information may be computer-readable instructions, data structures, modules of a program, or other data. Examples of computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technologies, read-only disc read-only memory (CD-ROM), digital versatile disc (DVD) or other optical storage, Magnetic tape cartridges, magnetic tape storage or other magnetic storage devices or any other non-transmitting medium may be used to store information that can be accessed by a computing device. As defined herein, computer-readable media does not include temporary computer-readable media, such as modulated data signals and carrier waves.

It should be noted that the computer-readable storage medium in the embodiments of the present disclosure is a computer-readable storage medium corresponding to the method of sending the uplink control channel, and all embodiments of the method of sending the uplink control channel are applicable to the terminal and can achieve the same or similar beneficial effects.

Figure 4:
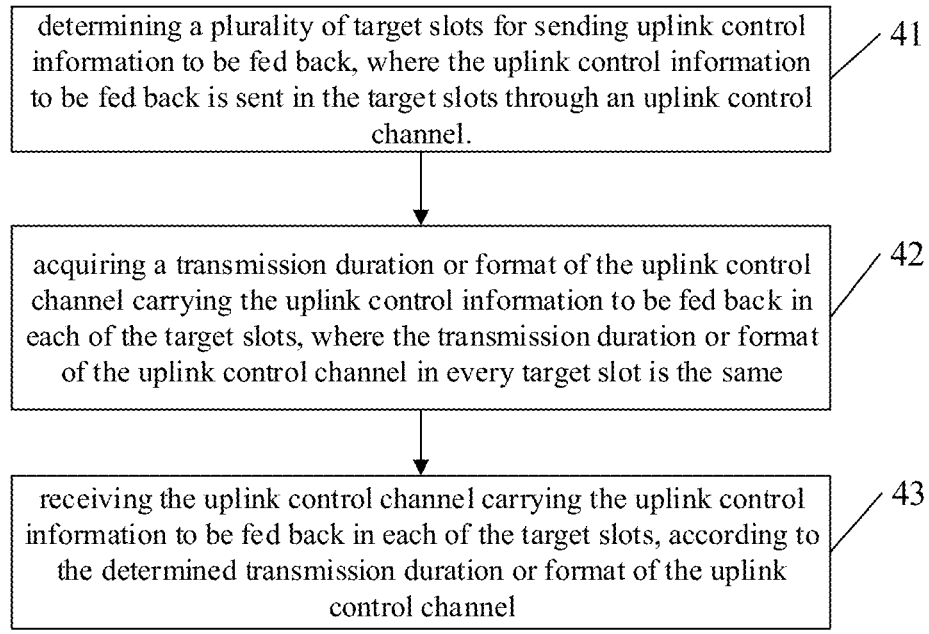
FIG. 4 is a of a method of receiving an uplink control channel in some embodiments of the present disclosure.

In order to better describe the method of sending the uplink control channel, as shown in FIG. 4, a method of receiving an uplink control channel is further provided in the embodiments of the present disclosure, which is applied to a base station side and includes:

Step 41: determining a plurality of target slots for sending uplink control information to be fed back, where the uplink control information to be fed back is sent in the target slots through an uplink control channel.

In this step, the method for sending an uplink control channel is generally applied to the terminal side, that is, the terminal determines the uplink control information UCI to be fed back, and determines that the UCI to be fed back is transmitted through the uplink control channel in multiple target slots.

Step 42: acquiring a transmission duration or format of the uplink control channel carrying the uplink control information to be fed back in each of the target slots, where the transmission duration or format of the uplink control channel in every target slot is the same.

In this step, the transmission durations or formats of the uplink control channel carrying the UCI to be fed back in different target slots are the same. For example, the transmission duration of the uplink control channel carrying the UCI to be fed back in the target slot 1 is 7 symbols, the transmission durations of the uplink control channel carrying the UCI to be fed back in other target slots (such as target slots 2, 3, etc.) are also 7 symbols.

Step 43: receiving the uplink control channel carrying the uplink control information to be fed back in each of the target slots, according to the determined transmission duration or format of the uplink control channel.

In this step, a transmission duration or format corresponds to a transmission structure, that is, an uplink control channel carrying the UCI to be fed back is sent in each target slot according to the corresponding transmission structure.

Specifically, Step 41 in the embodiments of the present disclosure includes:

determining the plurality of target slots for sending the uplink control information to be fed back, according to predefined information of the plurality of target slots, where the pre-definition is a definition of a standard complied by both the terminal and the base station. Specifically, the information of the plurality of target slots includes at least: a quantity of the target slots and the identification of the target slots; for example, four target slots which are target slot 1, target slot 2, target slot 3 and target slot 4.

Further, in some embodiments of the present disclosure, after Step 41, the method includes:

sending information of the plurality of target slots to a terminal through a high layer signalling or a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Specifically, Step 42 in the embodiments of the present disclosure includes:

acquiring the transmission duration or format of the uplink control channel carrying the uplink control information to be fed back in each of target slots, according to a pre-definition; or determining the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots. For example, the transmission duration or format of the uplink control channel is determined according to the size of the uplink area of the first target slot among multiple target slots; for another example, the transmission duration or format of the uplink control channel is determined according to the average value of the sizes of the uplink areas of all target slots in the multiple target slots; for another example, the transmission duration or format of the uplink control channel is determined according to the size of the uplink area of the target slot having the smallest uplink area among the multiple target slots.

It should be noted that the transmission duration of the uplink control channel and the format thereof may be in a one-to-one correspondence. For example, one transmission duration corresponds to a unique format, or one format corresponds to a unique transmission duration. Alternatively, the same transmission duration may correspond to multiple formats, so the transmission duration may be by determined once the format is determined; or the same format may correspond to multiple transmission durations, so the format may be determined once the transmission duration is determined.

Further, in the embodiments of the present disclosure, after Step 42, the method further includes:

sending the transmission duration or format of the uplink control channel carrying the uplink control information to be fed back in each of the target slots, through a high layer signalling or a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Specifically, in some embodiments of the present disclosure, Step 43 includes:

determining a transmission structure of the uplink control information and a reference signal in the uplink control channel, according to the determined transmission duration or format of the uplink control channel;

receiving the uplink control channel carrying the uplink control information to be fed back and the reference signal in each of the target slots, according to the transmission structure In some embodiments of the present disclosure, one transmission duration or format corresponds to a transmission structure of uplink control information UCI and reference signal RS. That is, a mapping structure when the uplink control channel performs UCI and RS mapping may be determined according to the transmission duration or format. In other words, which of the multiple symbols occupied by the uplink control channel are used to transmit UCI and which of the symbols are used to transmit RS. For example, if the transmission duration is 7 symbols and the format is x1, the corresponding structure of UCI and RS is UURRRUU (or URUURRU), where U is the symbol position for transmitting UCI among the 7 symbols, and R is the symbol position for transmitting RS among the 7 symbols. For another example, if the transmission duration is 4 symbols and the format is x2, the corresponding structure of UCI and RS is URRU (or RURU). In summary, once the transmission duration or format is determined, the corresponding structure of UCI and RS may be determined, and then the UCI and RS may be transmitted in the uplink control channel according to the structure.

It should be noted that the above-mentioned transmission structures are only some embodiments of the present disclosure, and there may be other structures. For different transmission durations and the determination whether there is frequency hopping between symbols, there may also be different structures of UCI and RS, which is not described herein.

In some embodiments of the present disclosure, since multiple target slots may include the same uplink area or an uplink area for transmitting an uplink control channel, or may include different uplink areas or uplink areas for transmitting an uplink control channel, for the uplink control channels having the same transmission duration or format, the positions of the uplink control channels in multiple target slots may be the same or different. Therefore, in order to more accurately determine the position of the uplink control channel carrying the UCI to be fed back, the method of sending an uplink control channel in the embodiments of the present disclosure may further determine a starting position and/or an end position of the uplink control channel in each of the multiple target slots.

Specifically, the determining the starting position and/or the end position of the uplink control channel in each of the multiple target slots further includes:

determining a start position and/or an end position of the uplink control channel in one or more target slots, according to a pre-agreed rule.

And the method further includes:

sending to a terminal a start position and/or an end position of the uplink control channel in one or more target slots, through a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots Specifically, if each of the multiple target slots includes an uplink area of the same size or an uplink area of the same size for transmitting an uplink control channel, then:

the starting position and/or the end position of the uplink control channel in the uplink area (or the uplink area for transmitting the uplink control channel) of every target slot is the same, which may be a pre-agreed position or may be determined according to an indication field in a preset downlink control channel.

If at least two of the multiple target slots include uplink areas of different sizes or uplink areas of different sizes for transmitting uplink control channels, then:

the start position and/or the end position of each uplink control channel may be determined according to an indication field of the preset downlink control channel, where each target slot in the multiple target slots corresponds to an independent indication.

Alternatively, the start position and/or the end position of the uplink control channel in the first target slot of the multiple target slots is determined according to an indication field in a preset downlink control channel, where the preset downlink control channel only indicates one start position and/or end position. However, in other target slots of multiple target slots, the start position and/or end position of the uplink control channel thereof is determined according to a pre-agreed rule. For example, it is pre-agreed that the uplink control channel occupies the entire uplink area in the target subframe or the entire uplink area for transmitting the uplink control channel in the target subframe, or it is pre-agreed that uplink control channel begins from the $A_{th}$ symbol in the uplink area in the target subframe or from the $A_{th}$ symbol in the uplink area for transmitting the uplink control channel in the target subframe, or it is pre-agreed that uplink control channel ends at the $B_{th}$ last symbol in the uplink area in the target subframe or from the $B_{th}$ last symbol in the uplink area for transmitting the uplink control channel in the target subframe, and the like.

Alternatively, in each of the multiple target slots, the start position and/or end position of the uplink control channel thereof is determined according to a pre-agreed rule. For example, it is pre-agreed that the uplink control channel occupies the entire uplink area in the target subframe or the entire uplink area for transmitting the uplink control channel in the target subframe, or it is pre-agreed that uplink control channel begins from the $A_{th}$ symbol in the uplink area in the target subframe or from the $A_{th}$ symbol in the uplink area for transmitting the uplink control channel in the target subframe, or it is pre-agreed that uplink control channel ends at the $B_{th}$ last symbol in the uplink area in the target subframe or from the $B_{th}$ last symbol in the uplink area for transmitting the uplink control channel in the target subframe, and the like.

It should be noted that:

If the information indicating the structure of the target slot is not obtained (that is, the uplink area or the uplink area used for transmitting the uplink control channel in each target slot cannot be determined), or if the size of the uplink area in the target slot (or the size of the uplink area for transmitting the uplink control channel) is smaller than the transmission duration corresponding to the determined transmission duration or the determined format, or the start position and/or the end position determined according to an indication field of a preset downlink control channel or according to a pre-agreed rule does not match the uplink area in the target slot (or the area for transmitting the uplink control channel in the uplink area) (for example, the indicated start and/or end positions are not in this range), the terminal may skip this target slot and continue the transmission in the next target slot (this target slot may be counted nor not counted into N target slots, N is the predetermined quantity of target slots for transmitting UCI).

Further, in the above case, if the terminal receives a preset downlink control channel and the preset downlink control channel indicates the starting position and/or the end position of the uplink control channel, the terminal may also transmit the uplink control channel in the target slot according to the indicated starting position and/or the end position and the transmission duration corresponding to determined transmission duration or the determined format (that is, regardless of the uplink and downlink resource allocation in the target slot, regardless of the size of the uplink area or the area used to transmit the uplink control channel in the uplink area in the target slot, the terminal always transmits according to the indicated position). Alternatively, in the above case, the terminal always determines the target slot according to a predetermined rule The start position and/or the end position in the channel, and the determined transmission duration or the transmission duration corresponding to the determined format, uplink control channel transmission is performed in the target slot (that is, regardless of the uplink and downlink resources in the target slot) Allocation regardless of the size of the uplink area in the target slot or the area used to transmit the uplink control channel in the uplink slot, and finally Always transmitted according to the position indication); or the terminal may transmit the uplink control channel in the target slot according to the starting position and/or the end position in the target slot determined based on the pre-agreed rule and the transmission duration corresponding to determined transmission duration or the determined format (that is, regardless of the uplink and downlink resource allocation in the target slot, regardless of the size of the uplink area or the area used to transmit the uplink control channel in the uplink area in the target slot, the terminal always transmits according to the indicated position).

Specifically, in some embodiments of the present disclosure, Step 43 includes:

in the case that a size of the uplink control information to be fed back is smaller than or equal to a first preset value, receiving the uplink control channel carrying a modulation symbol in each of the target slots, where the modulation symbol is acquired by modulating the uplink control information to be fed back by a terminal, where the first preset value is generally be set to 2 bits, that is, when the UCI to be fed back occupies 1 bit or 2 bits, the 1 or 2 bits UCI is modulated to obtain one modulation symbol, the obtained modulation symbol is repeatedly transmitted in each target slot of the multiple target slots and in an uplink control channel having a corresponding transmission duration or format;

in the case that the size of the uplink control information to be fed back is larger than the first preset value, receiving the uplink control channel carrying a first bit sequence in each of the target slots, where when the UCI to be fed back is greater than 2 bits, the channel coding and rate matching is performed for the UCI to be fed back according to a quantity of symbols carrying the uplink control information in the uplink control channel having a corresponding transmission duration or format, to obtain the encoded first bit sequence, and repeatedly send the first bit sequence in each of the target slots;

or, in the case that the size of the uplink control information to be fed back is larger than the first preset value, receiving, in each target slot, the uplink control channel carrying a sub bit sequence of a second bit sequence corresponding to the each target slot, that is, when the UCI to be fed back is greater than 2 bits, the channel coding and the rate matching are performed for the UCI to be fed back based on the quantity of symbols carrying the UCI and the quantity of target slots in the uplink control channel having the corresponding transmission duration or format, to obtain the encoded second bit sequence, and then the sub bit sequence corresponding to the target slot in the second bit sequence is taken to be transmitted in the target slot. For example, the second bit sequence is 111000111, and there are three target slots which are target slot 1, target slot 2 and target slot is 3. The sub bit sequence corresponding to target slot 1 is 111, the sub bit sequence corresponding to the target slot 2 is 000, and the sub bit sequence corresponding to the target slot 3 is 111. Then, the uplink control channel carrying the sub bit sequence 111 is transmitted in the target slot 1, the uplink control channel carrying the sub bit sequence 000 is transmitted in the target slot 2, and the uplink control channel carrying the sub bit sequence 111 is transmitted in the target slot 3.

The first bit sequence is an encoded bit sequence acquired by performing by the terminal a channel coding and a rate matching for the uplink control information to be fed back according to a quantity of symbols carrying the uplink control information in the uplink control channel; the second bit sequence is an encoded bit sequence acquired by performing by the terminal a channel coding and a rate matching for the uplink control information to be fed back according to the quantity of symbols carrying the uplink control information and a quantity of the target slots in the uplink control channel.

Furthermore, in some embodiments of the present disclosure, after the base station receives the uplink control channel, the method further includes:

Step 44: acquiring, from the uplink control channel, the uplink control information to be fed back.

Specifically, Step 44 includes:

in the case that a size of the uplink control information to be fed back is smaller than or equal to a first preset value, combining the modulation symbol received in every target slot (either a combination of modulation symbols or a combination of bits), and determining the uplink control information to be fed back based on the combined modulation symbol;

in the case that the size of the uplink control information to be fed back is larger than the first preset value, combining the first bit sequence received in every target slot, and decoding the combined first bit sequence to determine the uplink control information to be fed back; or combining a modulation symbol sequence corresponding to the first bit sequence received in every target slot, obtaining the first bit sequence based on the combined modulation symbol sequence, and decoding the first bit sequence to determine the uplink control information to be fed back, i.e., the base station combines the information received in every target slot to obtain the UCI sent by the terminal; or cascading a sub sequence of the second bit sequence received in every target slot to obtain the second bit sequence, and decoding the second bit sequence to determine the uplink control information to be fed back, i.e., the base station cascades the information received in every target slot to perform a channel decoding thereon to obtain the UCI sent by the terminal.

In summary, according to the method of receiving an uplink control channel in some embodiments of the present disclosure, when the terminal needs to transmit the uplink control channel in a plurality of target slots, the terminal transmits the uplink control channel according to the same transmission duration or format of the uplink control channel in the plurality of target slots, thereby transmitting the uplink control channel in the plurality of target slots.

Figure 5:
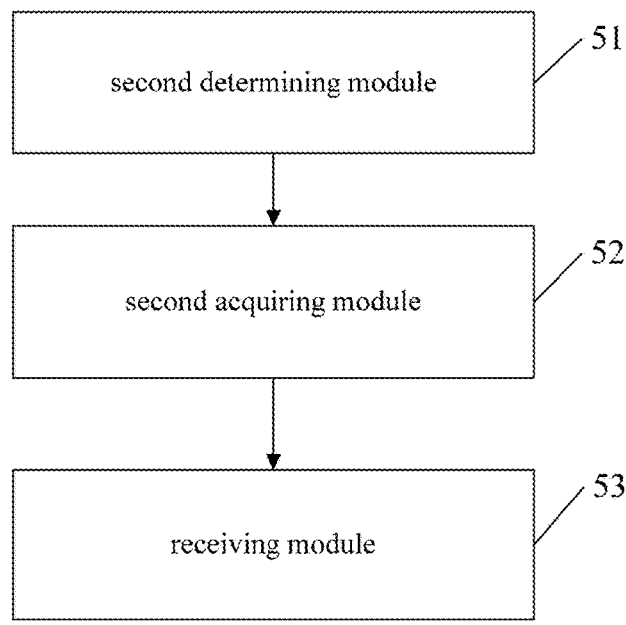
FIG. 5 is a schematic view of a device of receiving an uplink control channel in some embodiments of the present disclosure.

In order to better achieve the foregoing objective, as shown in FIG. 5, a device of receiving an uplink control channel is further provided in some embodiments of the present disclosure, including:

a second determining module 51, configured to determine a plurality of target slots for sending uplink control information to be fed back, where the uplink control information to be fed back is sent in the target slots through an uplink control channel;

a second acquiring module 52, configured to acquire a transmission duration or format of the uplink control channel carrying the uplink control information to be fed back in each of the target slots, where the transmission duration or format of the uplink control channel in every target slot is the same; and a receiving module 53, configured to receive the uplink control channel carrying the uplink control information to be fed back in each of the target slots, according to the determined transmission duration or format of the uplink control channel.

Optionally, in some embodiments of the present disclosure, the second determining module includes:

a fourth determining sub-module, configured to determine the plurality of target slots for sending the uplink control information to be fed back, according to predefined information of the plurality of target slots.

Optionally, in some embodiments of the present disclosure, the device further includes:

a first information sending module, configured to send information of the plurality of target slots to a terminal through a high layer signalling or a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Optionally, in some embodiments of the present disclosure, the second acquiring module includes:

a fifth acquiring module, configured to acquire the transmission duration or format of the uplink control channel carrying the uplink control information to be fed back in each of target slots, according to a pre-definition; or a sixth acquiring module, configured to determine the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots.

Optionally, in some embodiments of the present disclosure, the device further includes:

a second information sending module, configured to send the transmission duration or format of the uplink control channel carrying the uplink control information to be fed back in each of the target slots, through a high layer signalling or a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Optionally, in some embodiments of the present disclosure, the receiving module includes:

a transmission structure determining sub-module, configured to determine a transmission structure of the uplink control information and a reference signal in the uplink control channel, according to the determined transmission duration or format of the uplink control channel;

a first receiving sub-module, configured to receive the uplink control channel carrying the uplink control information to be fed back and the reference signal in each of the target slots, according to the transmission structure.

Optionally, in some embodiments of the present disclosure, the device further includes:

a third position determining sub-module, configured to determine a start position and/or an end position of the uplink control channel in one or more target slots, according to a pre-agreed rule.

Optionally, in some embodiments of the present disclosure, the device further includes:

a third information sending module, configured to send to a terminal a start position and/or an end position of the uplink control channel in one or more target slots, through a preset downlink control channel, where the preset downlink control channel includes at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, and a multicast downlink control channel for indicating slot format of the target slots.

Optionally, in some embodiments of the present disclosure, the receiving module includes:

a second receiving sub-module, configured to, in the case that a size of the uplink control information to be fed back is smaller than or equal to a first preset value, receive the uplink control channel carrying a modulation symbol in each of the target slots, where the modulation symbol is acquired by modulating the uplink control information to be fed back by a terminal;

a third receiving sub-module, configured to, in the case that the size of the uplink control information to be fed back is larger than the first preset value, receive the uplink control channel carrying a first bit sequence in each of the target slots, or in the case that the size of the uplink control information to be fed back is larger than the first preset value, receive, in each target slot, the uplink control channel carrying a sub bit sequence of a second bit sequence corresponding to the each target slot;

where the first bit sequence is an encoded bit sequence acquired by performing by the terminal a channel coding and a rate matching for the uplink control information to be fed back according to a quantity of symbols carrying the uplink control information in the uplink control channel; the second bit sequence is an encoded bit sequence acquired by performing by the terminal a channel coding and a rate matching for the uplink control information to be fed back according to the quantity of symbols carrying the uplink control information and a quantity of the target slots in the uplink control channel.

Optionally, in some embodiments of the present disclosure, the device further includes:

an information acquiring module, configured to acquire, from the uplink control channel, the uplink control information to be fed back.

Optionally, in some embodiments of the present disclosure, the information acquiring module includes:

a first information acquiring sub-module, configured to, in the case that a size of the uplink control information to be fed back is smaller than or equal to a first preset value, combine the modulation symbol received in every target slot, and determine the uplink control information to be fed back based on the combined modulation symbol;

a second information acquiring sub-module, configured to, in the case that the size of the uplink control information to be fed back is larger than the first preset value, combine the first bit sequence received in every target slot, and decode the combined first bit sequence to determine the uplink control information to be fed back, or combine a modulation symbol sequence corresponding to the first bit sequence received in every target slot, obtain the first bit sequence based on the combined modulation symbol sequence, and decode the first bit sequence to determine the uplink control information to be fed back; or cascade a sub sequence of the second bit sequence received in every target slot to obtain the second bit sequence, and decode the second bit sequence to determine the uplink control information to be fed back.

In summary, according to the device of receiving an uplink control channel in some embodiments of the present disclosure, when the terminal needs to transmit the uplink control channel in a plurality of target slots, the terminal transmits the uplink control channel according to the same transmission duration or format of the uplink control channel in the plurality of target slots, thereby transmitting the uplink control channel in the plurality of target slots.

It should be noted that the device of receiving the uplink control channel in the embodiments of the present disclosure is a receiving device corresponding to the method of receiving the uplink control channel, and all embodiments of the method of receiving the uplink control channel are applicable to the device of receiving the uplink control channel and can achieve the same or similar beneficial effects.

Figure 6:
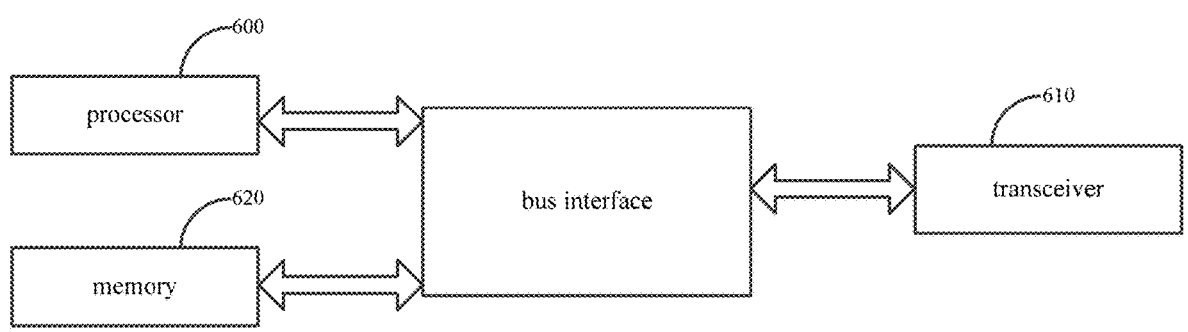
FIG. 6 is a schematic view of a base station in some embodiments of the present disclosure.

In order to better achieve the foregoing objective, as shown in FIG. 6, a base station is further provided in some embodiments of the present disclosure, including: including: a processor 600, a memory 620 connected to the processor 600 via a bus interface and a transceiver 610 connected to the processor 600 via the bus interface, the memory 620 is configured to store program and data used by the processor 600 when performing an operation, and a control command is sent by the transceiver 610. When the program and data stored in the memory 620 is called and executed by the processor 600, the program is executed by the processor 600 to perform:

determining a plurality of target slots for sending uplink control information to be fed back, where the uplink control information to be fed back is sent in the target slots through an uplink control channel;

acquiring a transmission duration or format of the uplink control channel carrying the uplink control information to be fed back in each of the target slots, where the transmission duration or format of the uplink control channel in every target slot is the same; and receiving the uplink control channel carrying the uplink control information to be fed back in each of the target slots, according to the determined transmission duration or format of the uplink control channel.

As shown in FIG. 6, the bus architecture may include any number of interconnected buses and bridges. Specifically, one or more processors represented by the processor 600 and various circuits of the memory represented by the memory 620 are linked together. The bus architecture can also link various other circuits such as peripherals, voltage regulators, and power management circuits, which are well known in the art, so they are not further described herein. The bus interface provides an interface. The transceiver 610 may be multiple elements, including a transmitter and a transceiver, providing a unit for communicating with various other devices over a transmission medium. The processor 600 is responsible for managing the bus architecture and general processing, and the memory 620 may store data used by the processor 600 when performing operations.

The processor 600 is responsible for managing the bus architecture and general processing, and the memory 620 may store data used by the processor 600 when performing operations.

In summary, according to the base station in some embodiments of the present disclosure, when the terminal needs to transmit the uplink control channel in a plurality of target slots, the terminal transmits the uplink control channel according to the same transmission duration or format of the uplink control channel in the plurality of target slots, thereby transmitting the uplink control channel in the plurality of target slots.

It should be noted that the base station in the embodiments of the present disclosure is a base station corresponding to the method of receiving the uplink control channel, and all embodiments of the method of receiving the uplink control channel are applicable to the base station and can achieve the same or similar beneficial effects.

In order to better achieve the foregoing objective, a computer-readable storage medium is further provided in some embodiments of the present disclosure, where a computer program is stored in the computer-readable storage medium, and the computer program is executed by the processor to perform:

determining a plurality of target slots for sending uplink control information to be fed back, where the uplink control information to be fed back is sent in the target slots through an uplink control channel;

acquiring a transmission duration or format of the uplink control channel carrying the uplink control information to be fed back in each of the target slots, where the transmission duration or format of the uplink control channel in every target slot is the same; and receiving the uplink control channel carrying the uplink control information to be fed back in each of the target slots, according to the determined transmission duration or format of the uplink control channel.

The computer-readable storage medium includes permanent and non-permanent, removable and non-removable media. Information can be stored by any method or technology. Information may be computer-readable instructions, data structures, modules of a program, or other data. Examples of computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technologies, read-only disc read-only memory (CD-ROM), digital versatile disc (DVD) or other optical storage, Magnetic tape cartridges, magnetic tape storage or other magnetic storage devices or any other non-transmitting medium may be used to store information that can be accessed by a computing device. As defined herein, computer-readable media does not include temporary computer-readable media, such as modulated data signals and carrier waves.

It should be noted that the computer-readable storage medium in the embodiments of the present disclosure is a computer-readable storage medium corresponding to the method of receiving the uplink control channel, and all embodiments of the method of receiving the uplink control channel are applicable to the computer-readable storage medium and can achieve the same or similar beneficial effects.

In order to better achieve the foregoing objective, a method for sending and receiving an uplink control channel in some embodiments of the present disclosure will be described by examples.

Assuming a slot contains 7 symbols (OFDM or SC-FDMA symbols), assuming that an uplink control channel (PUCCH) is scheduled or configured for transmission in 2 target slots, if it is configured, it can be pre-configured by high-level signaling, e.g., for periodic CSI/SR feedback. It can also be configured for downlink control channels, e.g., for example, for ACK/NACK feedback, the hybrid automatic repeat request HARQ feedback timing can be the ACK/NACK of the downlink transmission in the previous slot started to be fed back at the uplink area in the next slot, or the ACK/NACK of the downlink transmission in the current slot started to be fed back at the uplink area in the current slot. The HARQ feedback timing relationship can be predefined or it can be configured by high-level signaling or a related indication field in the downlink control channel.

Figure 7:
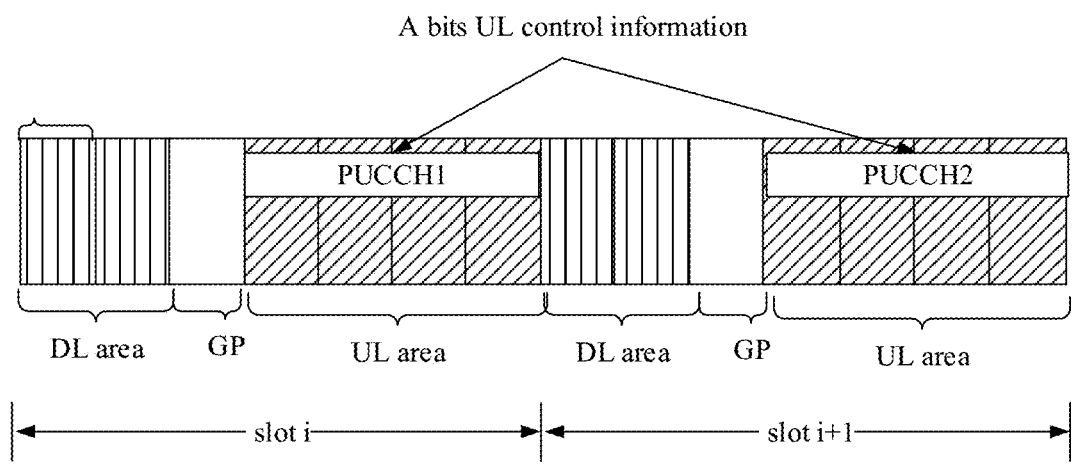
FIG. 7 is a first slot diagram in a specific application of the method in some embodiments of the present disclosure.

Case 1: the uplink areas in multiple target slots are the same. As shown in FIG. 7, the structures of slot i and slot i+1 are 2 symbols for the downlink area, 1 symbol for the guard interval GP, and 4 symbols are the uplink area.

The terminal determines that the CSI/SR feedback needs to be performed in slot i according to the feedback period of the periodic UCI, and determines that the transmission duration of the uplink control channel PUCCH is 4 symbols, according to a pre-agreement or a pre-configuration of the high layer signalling or according to a size of the uplink area of at least one of two slots (or a size of an area for transmitting the uplink control channel in the uplink area); or determines that the ACK/NACK needs to be fed back at the slot i according to the above HARQ timing, and determines that the transmission duration of the uplink control channel PUCCH is 4 symbols, according to a pre-agreement or a pre-configuration of the high layer signalling or according to a size of the uplink area of at least one of two slots (or a size of an area for transmitting the uplink control channel in the uplink area) or according to the indication field of the downlink control channel corresponding to the uplink control channel.

Then, in the uplink area in slot i and slot i+1, the transmission is performed according to the UCI and RS structure with the PUCCH having a length of 4, as shown in PUCCH1 and PUCCH2 in FIG. 7. PUCCH starts to transmit at the first symbol in the uplink area in every slot. Of course, the start position and/or end position of the PUCCH in the uplink area may also be notified by a signalling, e.g., the corresponding downlink control channel notification, thereby implementing the transmission of PUCCH on any part of symbols in the uplink area. The notification may be made only for the first slot, or there may be corresponding notification signaling for each slot, so the transmission positions in different slots may be different.

When the UCI does not exceed 2 bits, the UCI is repeatedly transmitted in every slot. In each slot, transmission is performed according to the UCI and RS structures with the same determined transmission duration, and then the base station side may receive the uplink control channel in timeslot i and timeslot i+1 according to the same transmission duration, and combine the UCI in the two timeslots to obtain the final UCI. When the UCI exceeds 2 bits, the transmission may be repeated in every timeslot, that is, the terminal side performs the channel coding and the rate matching based on the quantity of UCI transmission symbols in the UCI and RS structures determined according to the transmission duration, and then repeatedly transmits the same coded sequence in two slots, then the base station may receive the uplink control channel in timeslot i and timeslot i+1 according to the same transmission duration, and combine the UCI information received in the two timeslots to obtain the final UCI information. Alternatively, a joint coding transmission may be performed in the two slots, that is, the terminal side performs the channel coding and the rate matching based on the total number of UCI transmission symbols in the UCI and RS structures determined according to the transmission duration in the two slots, and then the transmission is divided into two parts and then transmitted in the two slots respectively, and then the base station side receives the uplink control channel in timeslot i and timeslot i+1 according to the same transmission duration, and cascades the UCI information received in two slots together to perform the channel decoding thereon to obtain the final UCI information.

Figure 8:
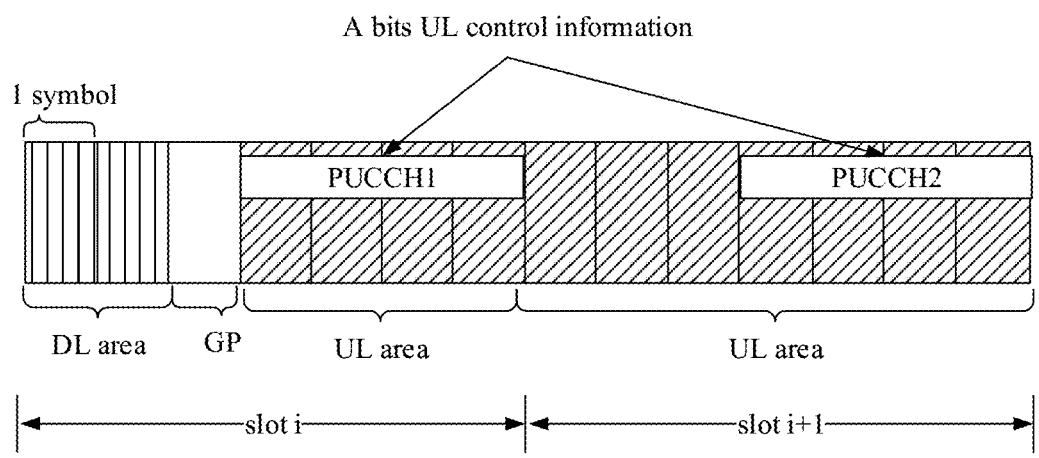
FIG. 8 is a second slot diagram in a specific application of the method in some embodiments of the present disclosure.

Case 2: the uplink areas in multiple target slots are different. As shown in FIG. 8, the structure of slot i is 2 symbols for downlink transmission, 1 symbol for guard interval GP, 4 symbols for uplink transmission, and the structure of slot i+1 is full uplink, that is, 7 symbols are transmitted for uplink; or as shown in FIG. 9, the structure of slot i is 2 symbols for downlink transmission, 1 symbol for guard interval GP, and 4 symbol for uplink transmission, and the structure of slot i+1 is 1 symbol for downlink transmission, 1 symbol for guard interval GP, and 5 symbols for uplink transmission.

The terminal determines that the CSI/SR feedback needs to be performed in slot i according to the feedback period of the periodic UCI, and determines that the transmission duration of the uplink control channel PUCCH is 4 symbols, according to a pre-agreement or a pre-configuration of the high layer signalling or according to a size of the uplink area of at least one of two slots (or a size of an area for transmitting the uplink control channel in the uplink area); or determines that the ACK/NACK needs to be fed back at the slot i according to the above HARQ timing, and determines that the transmission duration of the uplink control channel PUCCH is 4 symbols, according to a pre-agreement or a pre-configuration of the high layer signalling or according to a size of the uplink area of at least one of two slots (or a size of an area for transmitting the uplink control channel in the uplink area) (e.g., a size of the uplink area of the first slot, or a size of the smallest uplink area of the multiple slots) or according to the indication field of the downlink control channel corresponding to the uplink control channel.

Figure 9:
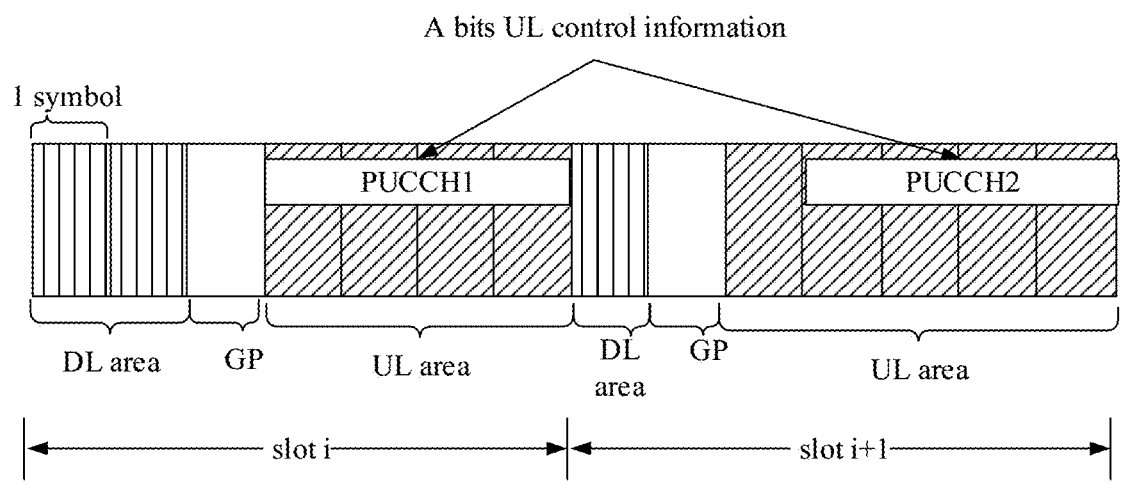
FIG. 9 is a third slot diagram in a specific application of the method in some embodiments of the present disclosure.

Then, in the uplink area in slot i and slot i+1, transmission is performed according to the UCI and RS structure of a PUCCH with a length of 4, as shown in PUCCH1 and PUCCH2 in FIG. 8, or PUCCH1 and PUCCH2 in FIG. 9. The PUCCH ends transmission in the last symbol of the UL region in each slot, that is, it always occupies the last 4 symbols in the uplink region to transmit, of course, it can also starts the transmission in the first symbol of the uplink region, that is, the first 4 symbols of the uplink area are always occupied for transmission. Of course, the start and/or the end position of the PUCCH in the uplink area may also be notified by a signalling, e.g., the corresponding downlink control channel notification, thereby implementing the transmission of PUCCH on any part of symbols in the uplink area. The notification may be made only for the first slot, or there may be corresponding notification signaling for each slot, so the transmission positions in different slots may be different.

When the UCI does not exceed 2 bits or exceeds 2 bits, the transmission method is the same as the case 1 above, and details thereof are not described herein again.

It should be noted that the slot format in the above embodiment is only for example, and the working principle is the same when each slot contains 14 symbols; the above PUCCH using 4 symbol lengths (or a format corresponding to 4 symbol lengths) for the transmission is for example, the PUCCH may also be transmitted using other symbol length/formats, such as any integer length from 4 to 14. The working method is the same, which is not described in detail herein.

The above are only some embodiments of the present disclosure, and it should be noted that those skilled in the art may also make several improvements and refinements without departing from the principles of the present disclosure, which should be considered as the scope of the present disclosure.

What is claimed is:

1. A method of sending an uplink control channel, comprising:
   determining a plurality of target slots for sending uplink control information to be fed back, wherein the uplink control information to be fed back is sent in the target slots through an uplink control channel;
   acquiring a transmission duration or format of the uplink control channel carrying the uplink control information to be fed back in each of the target slots, wherein the transmission duration or format of the uplink control channel in every target slot is the same; and
   sending, through the uplink control channel, the uplink control information to be fed back in each of the target slots, according to the determined transmission duration or format of the uplink control channel;
   wherein the sending the uplink control channel carrying the uplink control information to be fed back in each slot comprises:
   in the case that a size of the uplink control information to be fed back is smaller than or equal to a first preset value, modulating the uplink control information to be fed back to obtain a modulation symbol, and repeatedly sending the uplink control channel carrying the modulation symbol in each of the target slots;
   in the case that the size of the uplink control information to be fed back is larger than the first preset value, performing a channel coding and a rate matching for the uplink control information to be fed back, according to a quantity of symbols carrying the uplink control information in the uplink control channel, to obtain an encoded first bit sequence, and repeatedly sending the uplink control channel carrying the first bit sequence in each of the target slots; or in the case that the size of the uplink control information to be fed back is larger than the first preset value, performing a channel coding and a rate matching for the uplink control information to be fed back, according to a quantity of symbols carrying the uplink control information and a quantity of the target slots in the uplink control channel, to obtain an encoded second bit sequence, and sending, in each target slot, the uplink control channel carrying a sub bit sequence of the second bit sequence corresponding to the each target slot.

2. The method according to claim 1, wherein the determining the plurality of target slots for sending the uplink control information to be fed back comprises:
   determining the plurality of target slots for sending the uplink control information to be fed back, according to predefined information of the plurality of target slots; or
   determining the plurality of target slots for sending the uplink control information to be fed back, according to information of the plurality of target slots configured by a high layer signalling; or
   receiving information of the plurality of target slots sent by a preset downlink control channel, to determine the plurality of target slots for sending the uplink control information to be fed back;
   wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, or a multicast downlink control channel for indicating slot format of the target slots.

3. The method according to claim 1, wherein the acquiring the transmission duration or format of the uplink control channel carrying the uplink control information to be fed back in each of the target slots comprises:
   acquiring the transmission duration or format of the uplink control channel carrying the uplink control information to be fed back in each of target slots, according to a pre-definition; or determining the transmission duration or format of the uplink control channel carrying the uplink control information to be fed back in each of the target slots, according to a configuration of a high layer signalling; or determining the transmission duration or format of the uplink control channel carrying the uplink control information to be fed back in each of the target slots, according to an indication field in a preset downlink control channel, wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel or a multicast downlink control channel for indicating slot format of the target slots; or determining the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots.

4. The method according to claim 1, wherein the sending the uplink control channel carrying the uplink control information to be fed back in each of the target slots according to the determined transmission duration or format of the uplink control channel comprises:

determining a transmission structure of the uplink control information and a reference signal in the uplink control channel, according to the determined transmission duration or format of the uplink control channel;

sending the uplink control channel carrying the uplink control information to be fed back and the reference signal in each of the target slots, according to the transmission structure.

5. The method according to claim 4, further comprising:

receiving a start position and/or an end position of the uplink control channel in one or more target slots sent by a preset downlink control channel, wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel or a multicast downlink control channel for indicating slot format of the target slots; and/or, determining the start position and/or the end position of the uplink control channel in one or more target slots, according to a pre-agreed rule.

6. A method of receiving an uplink control channel, comprising:

determining a plurality of target slots for sending uplink control information to be fed back, wherein the uplink control information to be fed back is sent in the target slots through an uplink control channel;

acquiring a transmission duration or format of the uplink control channel carrying the uplink control information to be fed back in each of the target slots, wherein the transmission duration or format of the uplink control channel in every target slot is the same; and receiving, in each of the target slots, the uplink control information sent through the uplink control channel, according to the determined transmission duration or format of the uplink control channel;

wherein the receiving the uplink control channel carrying the uplink control information to be fed back in each of the target slots comprises:

in the case that a size of the uplink control information to be fed back is smaller than or equal to a first preset value, receiving the uplink control channel carrying a modulation symbol in each of the target slots, wherein the modulation symbol is acquired by modulating the uplink control information to be fed back by a terminal;

in the case that the size of the uplink control information to be fed back is larger than the first preset value, receiving the uplink control channel carrying a first bit sequence in each of the target slots, or in the case that the size of the uplink control information to be fed back is larger than the first preset value, receiving, in each target slot, the uplink control channel carrying a sub bit sequence of a second bit sequence corresponding to the each target slot;

wherein the first bit sequence is an encoded bit sequence acquired by performing by the terminal a channel coding and a rate matching for the uplink control information to be fed back according to a quantity of symbols carrying the uplink control information in the uplink control channel; the second bit sequence is an encoded bit sequence acquired by performing by the terminal a channel coding and a rate matching for the uplink control information to be fed back according to the quantity of symbols carrying the uplink control information and a quantity of the target slots in the uplink control channel.

7. The method according to claim 6, wherein the determining the plurality of target slots for sending the uplink control information to be fed back comprises:

determining the plurality of target slots for sending the uplink control information to be fed back, according to predefined information of the plurality of target slots; or, subsequent to the determining the plurality of target slots for sending the uplink control information to be fed back, the method comprises:

sending information of the plurality of target slots to a terminal through a high layer signalling or a preset downlink control channel;

wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, or a multicast downlink control channel for indicating slot format of the target slots.

8. The method according to claim 6, wherein the acquiring the transmission duration or format of the uplink control channel carrying the uplink control information to be fed back in each of the target slots comprises:

acquiring the transmission duration or format of the uplink control channel carrying the uplink control information to be fed back in each of target slots, according to a pre-definition; or determining the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots;

or, subsequent to the acquiring the transmission duration or format of the uplink control channel carrying the uplink control information to be fed back in each of the target slots, the method further comprises:

sending the transmission duration or format of the uplink control channel carrying the uplink control information to be fed back in each of the target slots, through a high layer signalling or a preset downlink control channel;

wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, or a multicast downlink control channel for indicating slot format of the target slots.

9. The method according to claim 6, wherein the receiving the uplink control channel carrying the uplink control information to be fed back in each of the target slots according to the determined transmission duration or format of the uplink control channel comprises:

determining a transmission structure of the uplink control information and a reference signal in the uplink control channel, according to the determined transmission duration or format of the uplink control channel;

receiving the uplink control channel carrying the uplink control information to be fed back and the reference signal in each of the target slots, according to the transmission structure.

10. The method according to claim 9, further comprising:
determining a start position and/or an end position of the uplink control channel in one or more target slots, according to a pre-agreed rule;

or, the method further comprises:

sending to a terminal a start position and/or an end position of the uplink control channel in one or more target slots, through a preset downlink control channel;

wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, or a multicast downlink control channel for indicating slot format of the target slots.

11. A device of sending an uplink control channel, comprising: a processor, a memory and a computer program stored in the memory and executable by the processor, wherein the computer program is executed by the processor to:

determine a plurality of target slots for sending uplink control information to be fed back, wherein the uplink control information to be fed back is sent in the target slots through an uplink control channel;

acquire a transmission duration or format of the uplink control channel carrying the uplink control information to be fed back in each of the target slots, wherein the transmission duration or format of the uplink control channel in every target slot is the same; and send, through the uplink control channel, the uplink control information to be fed back in each of the target slots, according to the determined transmission duration or format of the uplink control channel;

wherein the computer program is executed by the processor to:

in the case that a size of the uplink control information to be fed back is smaller than or equal to a first preset value, modulate the uplink control information to be fed back to obtain a modulation symbol, and repeatedly send the uplink control channel carrying the modulation symbol in each of the target slots;

in the case that the size of the uplink control information to be fed back is larger than the first preset value, perform a channel coding and a rate matching for the uplink control information to be fed back, according to a quantity of symbols carrying the uplink control information in the uplink control channel, to obtain an encoded first bit sequence, and repeatedly send the uplink control channel carrying the first bit sequence in each of the target slots; or in the case that the size of the uplink control information to be fed back is larger than the first preset value, perform a channel coding and a rate matching for the uplink control information to be fed back, according to a quantity of symbols carrying the uplink control information and a quantity of the target slots in the uplink control channel, to obtain an encoded second bit sequence, and send, in each target slot, the uplink control channel carrying a sub bit sequence of the second bit sequence corresponding to the each target slot.

12. The device according to claim 11, wherein the computer program is executed by the processor to:

determine the plurality of target slots for sending the uplink control information to be fed back, according to predefined information of the plurality of target slots; and/or determine the plurality of target slots for sending the uplink control information to be fed back, according to information of the plurality of target slots configured by a high layer signalling; and/or receive information of the plurality of target slots sent by a preset downlink control channel, to determine the plurality of target slots for sending the uplink control information to be fed back;

wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, or a multicast downlink control channel for indicating slot format of the target slots.

13. The device according to claim 11, wherein the computer program is executed by the processor to:

acquire the transmission duration or format of the uplink control channel carrying the uplink control information to be fed back in each of target slots, according to a pre-definition; and/or determine the transmission duration or format of the uplink control channel carrying the uplink control information to be fed back in each of the target slots, according to a configuration of a high layer signalling; and/or determine the transmission duration or format of the uplink control channel carrying the uplink control information to be fed back in each of the target slots, according to an indication field in a preset downlink control channel, wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel or a multicast downlink control channel for indicating slot format of the target slots; and/or determine the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots.

14. The device according to claim 11, wherein the computer program is executed by the processor to:
determine a transmission structure of the uplink control information and a reference signal in the uplink control channel, according to the determined transmission duration or format of the uplink control channel;
send the uplink control channel carrying the uplink control information to be fed back and the reference signal in each of the target slots, according to the transmission structure.

15. The device according to claim 14, wherein the computer program is executed by the processor to:
receive a start position and/or an end position of the uplink control channel in one or more target slots sent by a preset downlink control channel, wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel or a multicast downlink control channel for indicating slot format of the target slots; and/or,
determine the start position and/or the end position of the uplink control channel in one or more target slots, according to a pre-agreed rule.

16. A device of receiving an uplink control channel, comprising: a processor, a memory and a computer program stored in the memory and executable by the processor, wherein the computer program is executed by the processor to:
determine a plurality of target slots for sending uplink control information to be fed back, wherein the uplink control information to be fed back is sent in the target slots through an uplink control channel;
acquire a transmission duration or format of the uplink control channel carrying the uplink control information to be fed back in each of the target slots, wherein the transmission duration or format of the uplink control channel in every target slot is the same; and receive, in each of the target slots, the uplink control information sent through the uplink control channel, according to the determined transmission duration or format of the uplink control channel;

wherein the computer program is executed by the processor to:
in the case that a size of the uplink control information to be fed back is smaller than or equal to a first preset value, receive the uplink control channel carrying a modulation symbol in each of the target slots, wherein the modulation symbol is acquired by modulating the uplink control information to be fed back by a terminal;
in the case that the size of the uplink control information to be fed back is larger than the first preset value, receive the uplink control channel carrying a first bit sequence in each of the target slots, or in the case that the size of the uplink control information to be fed back is larger than the first preset value, receive, in each target slot, the uplink control channel carrying a sub bit sequence of a second bit sequence corresponding to the each target slot;
wherein the first bit sequence is an encoded bit sequence acquired by performing by the terminal a channel coding and a rate matching for the uplink control information to be fed back according to a quantity of symbols carrying the uplink control information in the uplink control channel; the second bit sequence is an encoded bit sequence acquired by performing by the terminal a channel coding and a rate matching for the uplink control information to be fed back according to the quantity of symbols carrying the uplink control information and a quantity of the target slots in the uplink control channel.

17. The device according to claim 16, wherein the computer program is executed by the processor to:
determine the plurality of target slots for sending the uplink control information to be fed back, according to predefined information of the plurality of target slots; or,
the computer program is executed by the processor to:
send information of the plurality of target slots to a terminal through a high layer signalling or a preset downlink control channel;
wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, or a multicast downlink control channel for indicating slot format of the target slots.

18. The device according to claim 16, wherein the computer program is executed by the processor to:
acquire the transmission duration or format of the uplink control channel carrying the uplink control information to be fed back in each of target slots, according to a pre-definition; or
determine the transmission duration or format of the uplink control channel carrying the uplink control information to be fed back in each of the target slots, according to a size of an uplink area in at least one target slot of the plurality of target slots or a size of an uplink area for transmitting the uplink control channel in at least one target slot of the plurality of target slots;

or, the computer program is executed by the processor to:

send the transmission duration or format of the uplink control channel carrying the uplink control information to be fed back in each of the target slots, through a high layer signalling or a preset downlink control channel;

wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, or a multicast downlink control channel for indicating slot format of the target slots.

19. The device according to claim 16, wherein the computer program is executed by the processor to:

determine a transmission structure of the uplink control information and a reference signal in the uplink control channel, according to the determined transmission duration or format of the uplink control channel;

receive the uplink control channel carrying the uplink control information to be fed back and the reference signal in each of the target slots, according to the transmission structure.

20. The device according to claim 19, wherein the computer program is executed by the processor to:

determine a start position and/or an end position of the uplink control channel in one or more target slots, according to a pre-agreed rule;

or, the computer program is executed by the processor to:

send to a terminal a start position and/or an end position of the uplink control channel in one or more target slots, through a preset downlink control channel;

wherein the preset downlink control channel comprises at least one of: a downlink control channel corresponding to a downlink shared channel for which the uplink control information is fed back in the uplink control channel, a downlink control channel for indicating a downlink semi-persistent scheduling resource release for which the uplink control information is fed back in the uplink control channel, or a multicast downlink control channel for indicating slot format of the target slots.

* * * * *